(12) United States Patent
Iseminger

(10) Patent No.: US 10,972,254 B2
(45) Date of Patent: Apr. 6, 2021

(54) BLOCKCHAIN CONTENT RECONSTITUTION FACILITATION SYSTEMS AND METHODS

(71) Applicant: Upheaval LLC, Lake Stevens, WA (US)

(72) Inventor: David Iseminger, Lake Stevens, WA (US)

(73) Assignee: Upheaval LLC, Lake Stevens, WA (US)

( * ) Notice: Subject to any disclaimer, the term of this patent is extended or adjusted under 35 U.S.C. 154(b) by 0 days.

(21) Appl. No.: 16/538,707

(22) Filed: Aug. 12, 2019

(65) Prior Publication Data
US 2019/0363875 A1 Nov. 28, 2019

Related U.S. Application Data

(63) Continuation-in-part of application No. 15/948,689, filed on Apr. 9, 2018, now Pat. No. 10,382,383.

(60) Provisional application No. 62/749,548, filed on Oct. 23, 2018, provisional application No. 62/538,445, filed on Jul. 28, 2017.

(51) Int. Cl.
*H04L 9/06* (2006.01)
*G06F 21/60* (2013.01)
*H04L 9/32* (2006.01)

(52) U.S. Cl.
CPC .......... *H04L 9/0643* (2013.01); *G06F 21/602* (2013.01); *H04L 9/3236* (2013.01); *H04L 9/3239* (2013.01); *H04L 2209/38* (2013.01)

(58) Field of Classification Search
CPC . H04L 2209/38; H04L 9/3239; H04L 9/0643; H04L 9/062; H04L 9/3236; G06F 21/602; G06F 21/60
See application file for complete search history.

(56) References Cited

U.S. PATENT DOCUMENTS

| | | | | |
|---|---|---|---|---|
| 10,114,969 B1* | 10/2018 | Chaney | ............... | G06F 21/6218 |
| 10,242,219 B2* | 3/2019 | Struttmann | .......... | G06F 21/6218 |
| 2018/0349121 A1* | 12/2018 | Bagarolo | ................ | H04L 43/08 |
| 2019/0034919 A1* | 1/2019 | Nolan | ................ | G06Q 20/3825 |
| 2019/0251199 A1* | 8/2019 | Klianev | ................ | G06Q 40/04 |
| 2019/0361917 A1* | 11/2019 | Tran | ...................... | G06Q 40/04 |
| 2020/0151266 A1* | 5/2020 | Takeuchi | ............... | G06Q 40/08 |

* cited by examiner

Primary Examiner — Chirag R Patel
(74) Attorney, Agent, or Firm — Adam L. K. Philipp; Jonathan E. Olson; Aeon Law

(57) ABSTRACT

Systems and methods are disclosed for using first and second nodes in a network-connected interactive environment. User content is obtained via a client computing device and rendered onto the first and second node such that secondary content thereof is stored onto other media. This facilitates regeneration and other orderly migration of a particular node transplanted to another environment.

20 Claims, 34 Drawing Sheets

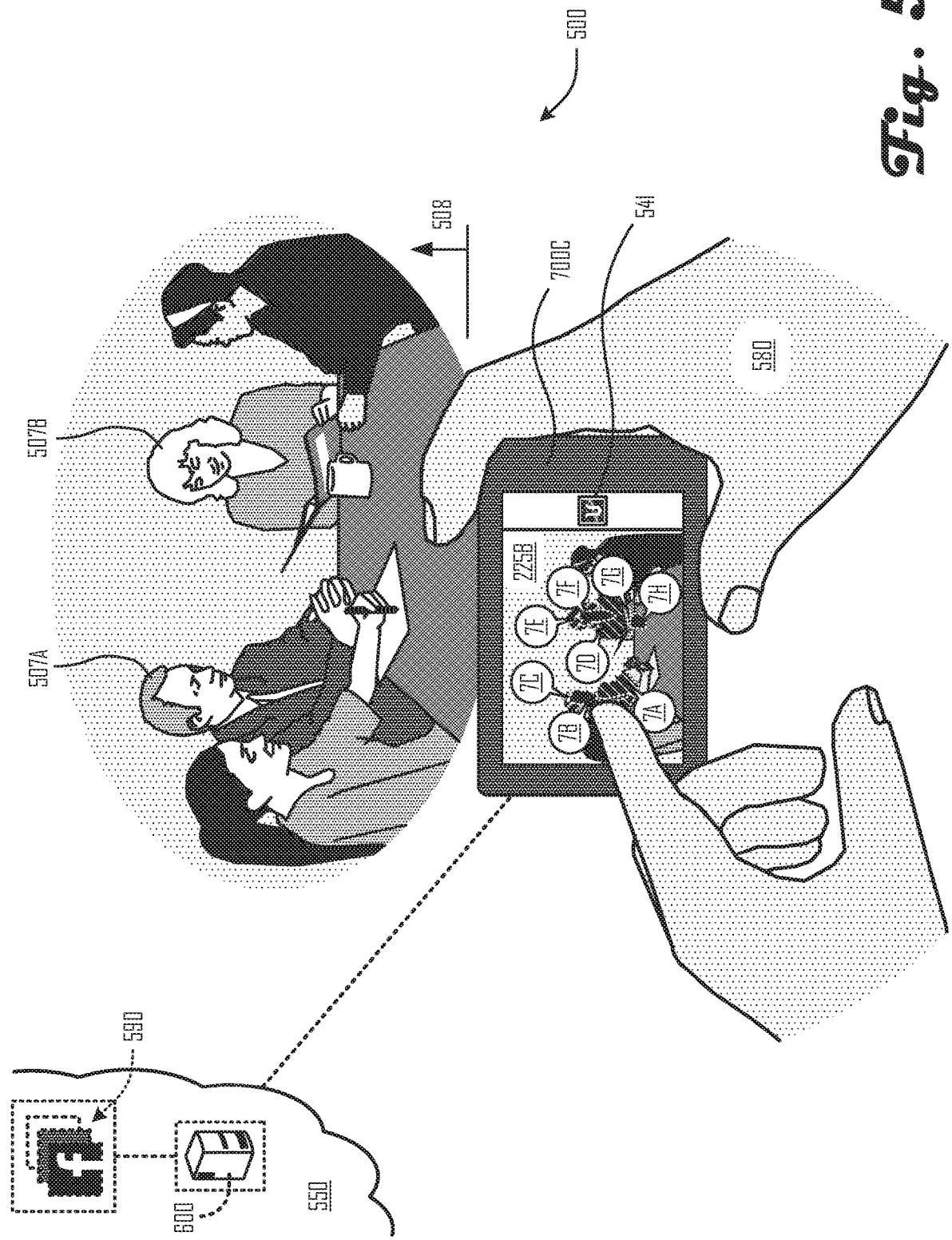

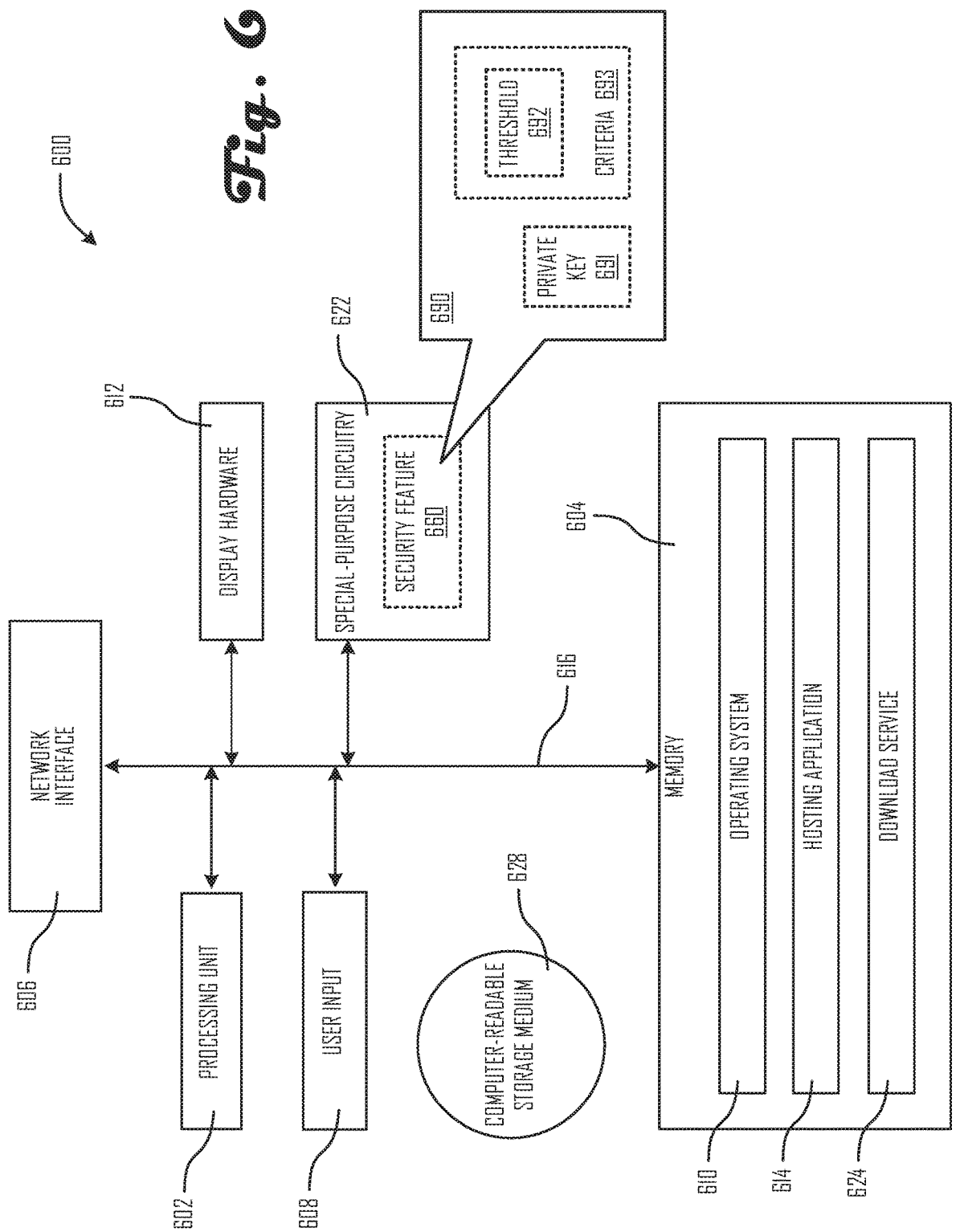

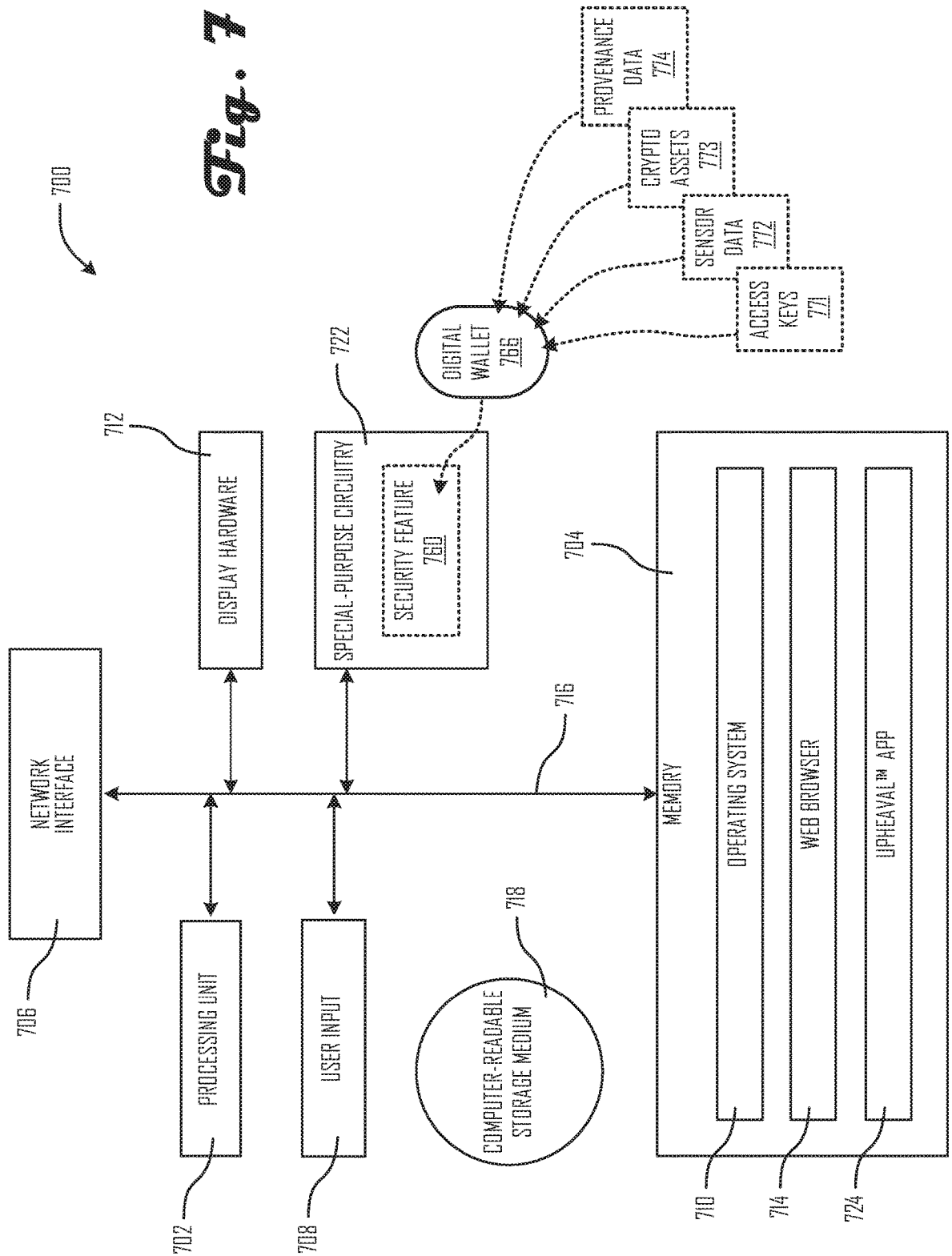

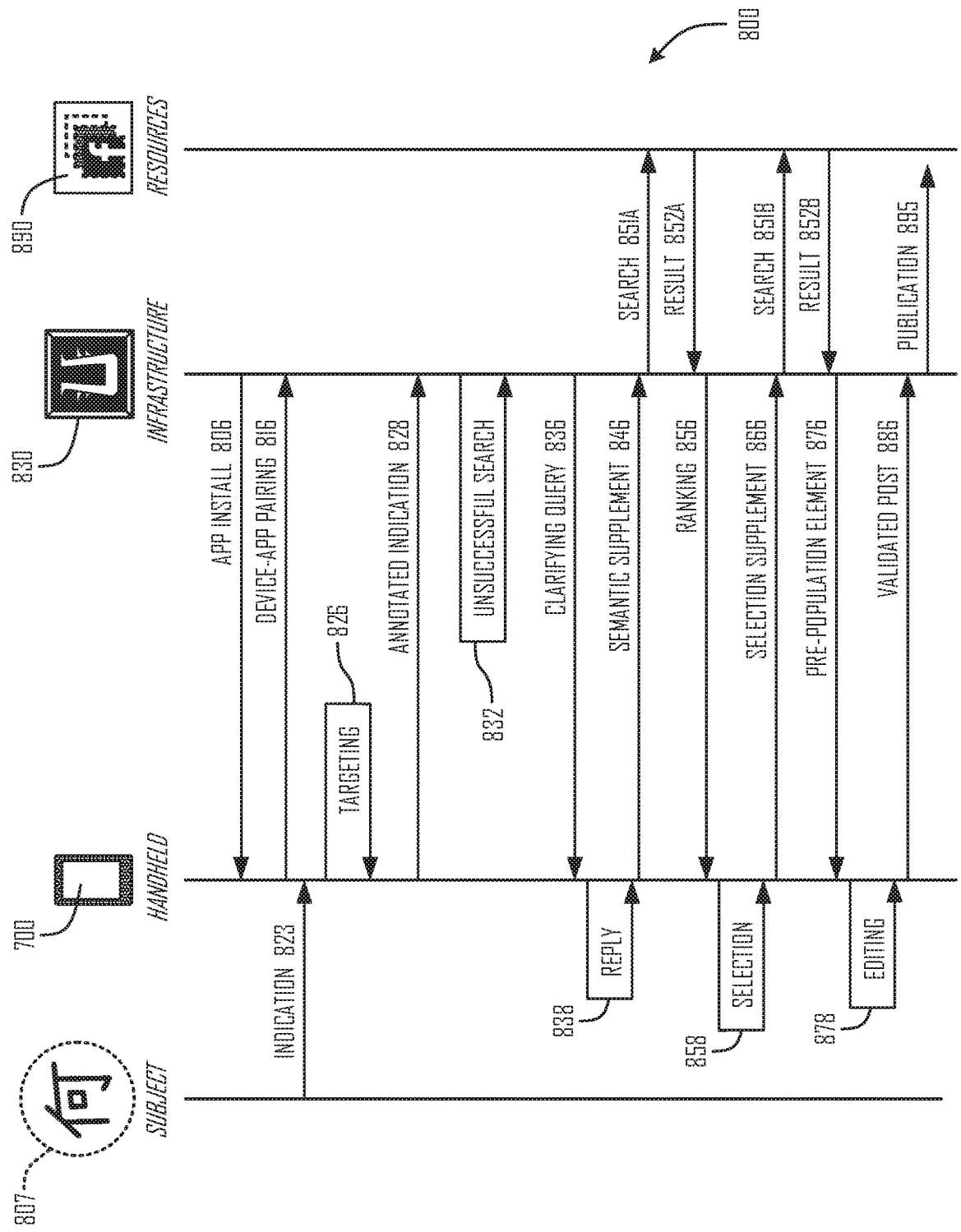

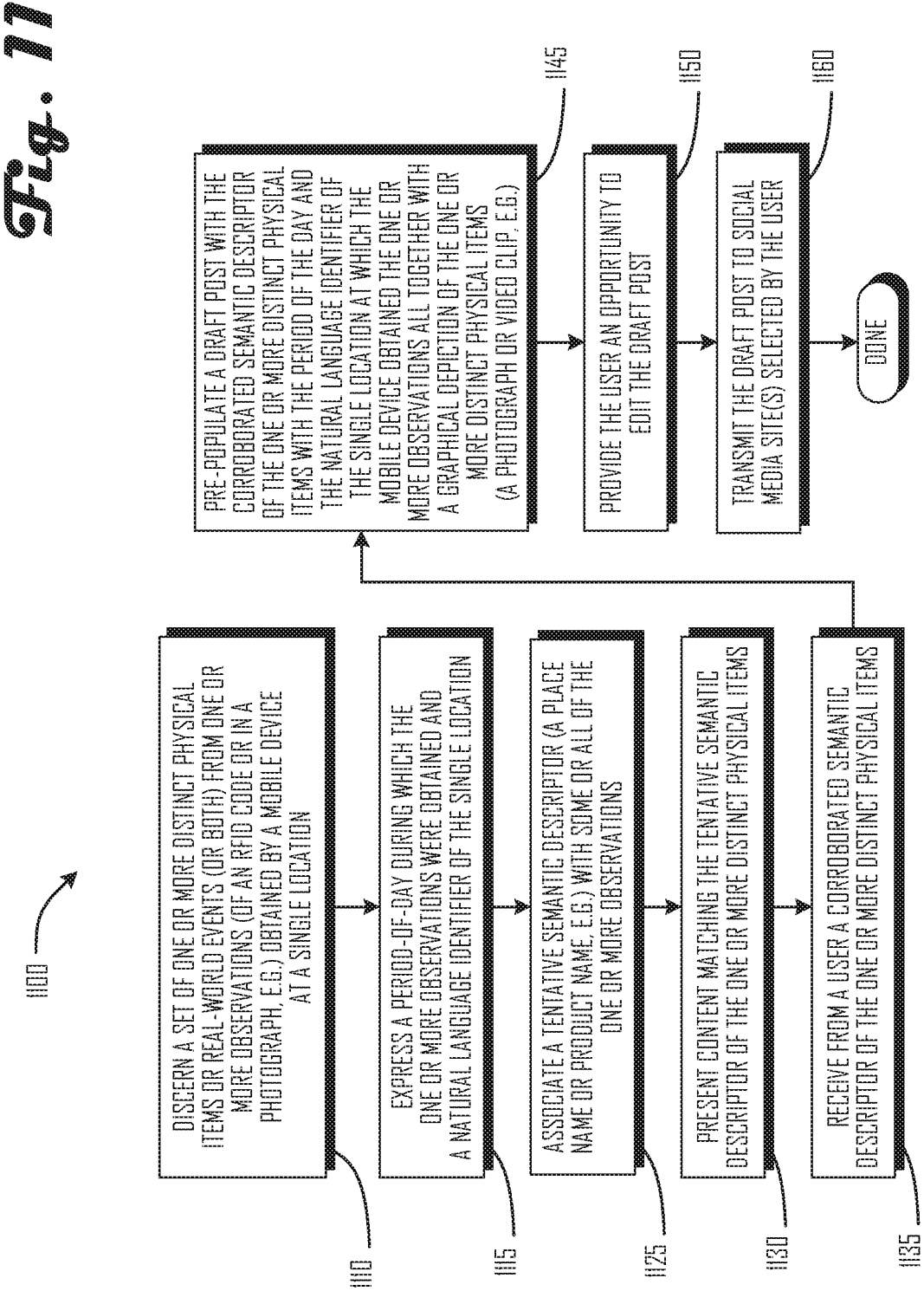

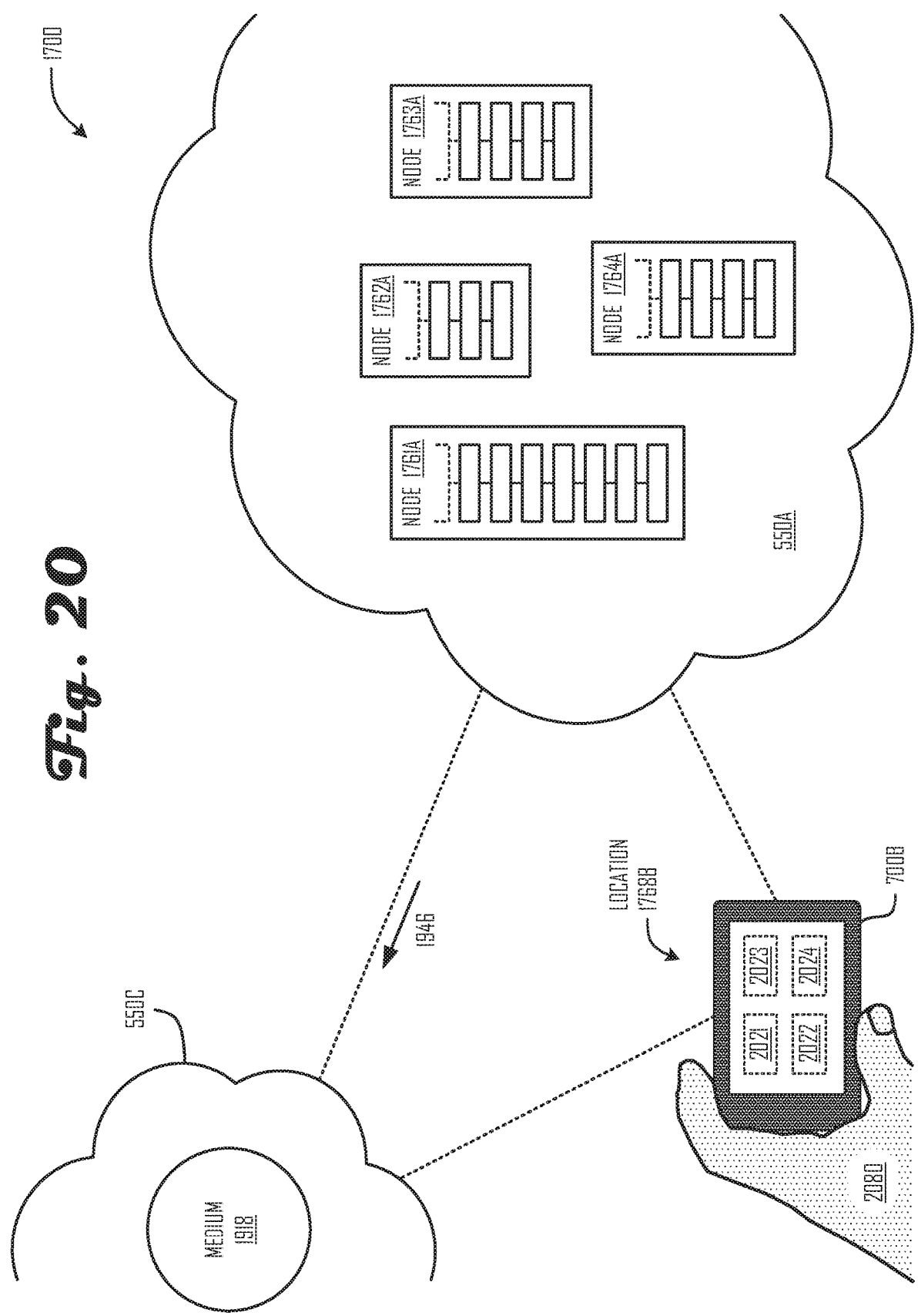

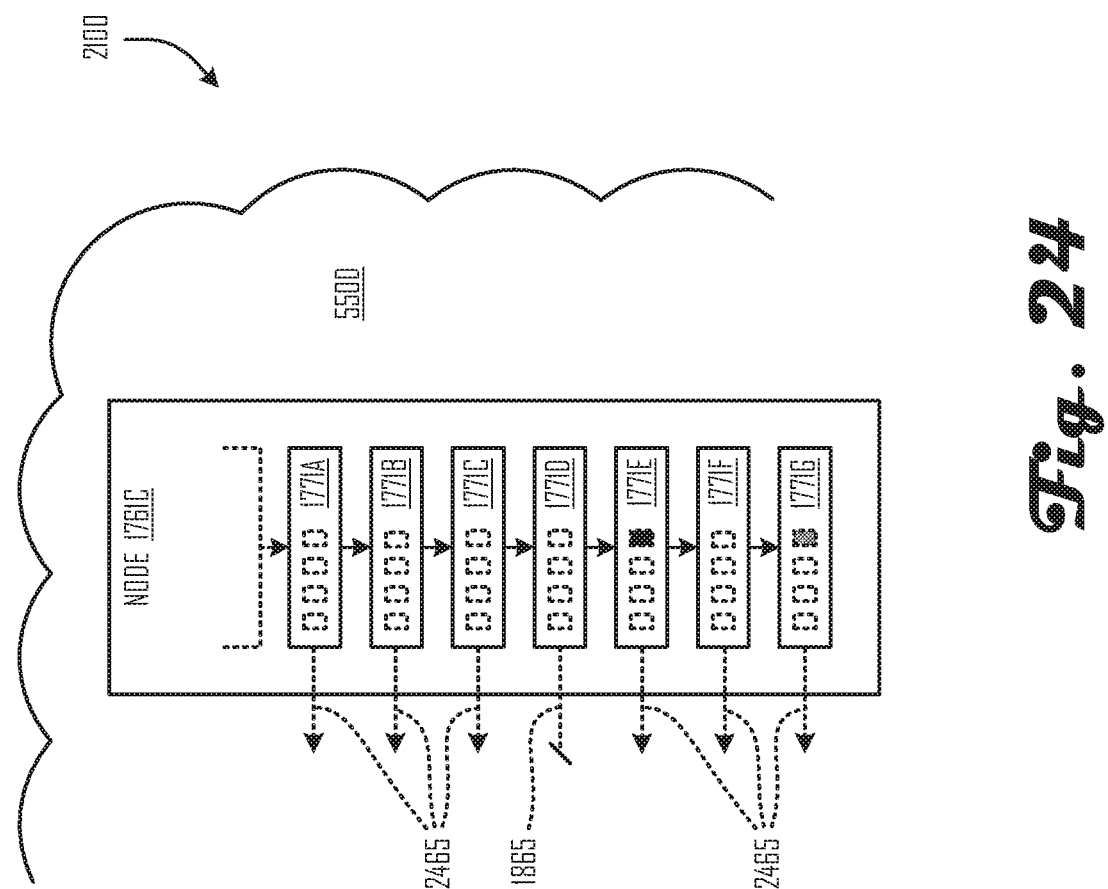

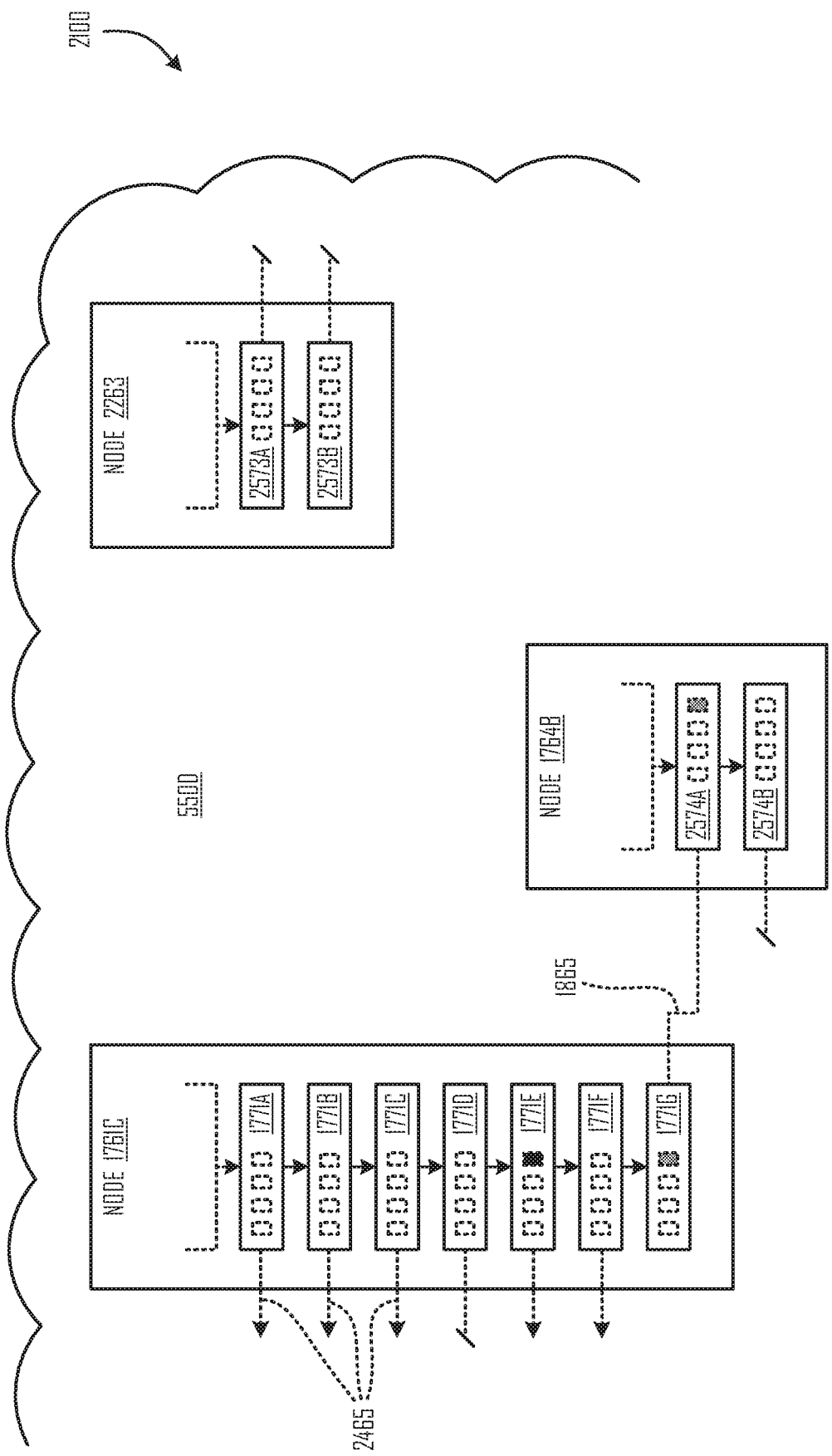

BLOCKCHAIN CONTENT RECONSTITUTION FACILITATION SYSTEMS AND METHODS

CROSS-REFERENCE TO RELATED APPLICATIONS

Parts of this application relate to Provisional Patent Application No. 62/538,445 (titled "SOCIAL MEDIA POST FACILITATION SYSTEMS AND METHODS" and filed 28 Jul. 2017), to Non-Provisional patent application Ser. No. 15/948,689 (titled "SOCIAL MEDIA POST FACILITATION SYSTEMS AND METHODS" and filed 9 Apr. 2018), and to Provisional Patent Application No. 62/749,548 (titled "BLOCKCHAIN CONTENT RECONSTITUTION FACILITATION SYSTEMS AND METHODS" and filed 23 Oct. 2018), all of which are incorporated by reference in their entirety for all purposes.

TECHNOLOGICAL FIELD

This disclosure relates primarily to business security and more particularly to secure protocols for using shared pointers and other content to facilitate blockchain or other node migration or reconstitution.

BRIEF DESCRIPTION OF THE DRAWINGS

FIG. 5 depicts a system in which a client device interacts with various real-world subjects and at least one data network in which one or more improved technologies may be incorporated.

FIG. 6 depicts parts of a server in which one or more improved technologies may be incorporated.

FIG. 7 depicts parts of a client device in which one or more improved technologies may be incorporated.

FIG. 8 depicts a data flow in which one or more improved technologies may be incorporated.

FIG. 11 depicts an operational flow in which one or more improved technologies may be incorporated.

FIG. 20 depicts additional information about the content of FIG. 18 in which one or more improved technologies may be incorporated.

FIG. 24 depicts a detailed version of FIG. 21 in which a "whole cloth" node migration to a new network has occurred and in which one or more improved technologies may be incorporated.

FIG. 25 depicts a more advanced state of the content of FIG. 24 in which a "partner block regeneration" has occurred and in which one or more improved technologies may be incorporated.

FIG. 41 depicts a sideline and a main line configured to facilitate a potential future migration as described herein in which one or more improved technologies may be incorporated.

DESCRIPTION

Figure 2:
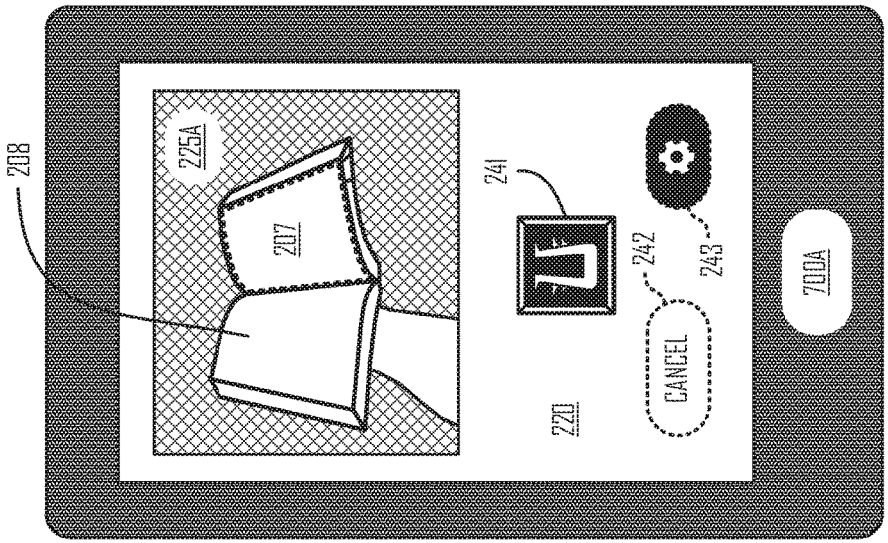
FIG. 2 depicts a client device displaying a photograph in which one or more improved technologies may be incorporated.

The detailed description that follows is represented largely in terms of processes and symbolic representations of operations by computer components adapted from existing techniques as explained below. In some variants such components may include a processor, memory storage devices for the processor, and connected display devices and input devices. Furthermore, some of these processes and operations may (optionally) interact with or otherwise utilize conventional computer components in a heterogeneous distributed computing environment, including remote file servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Associated," "at least," "based," "before," "closed," "corresponding," "corroborated," "counterpart," "cryptographic," "distinct," "having," "insofar that," "invoked," "likewise," "linked," "local," "mobile," "more," "natural," "near," "observational," "occurred," "on the order of," "open," "particular," "physical," "present," "protected," "raw," "recorded," "related," "remaining," "rendered," "second," "semantic," "single," "surreptitious," "tentative," "thereafter," "third," "uploaded," "using," "whole," "within," or other such descriptors herein are used in their normal yes-or-no sense, not merely as terms of degree, unless context dictates otherwise. In light of the present disclosure those skilled in the art will understand from context what is meant by "near" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures. "On the order of" or "within an order of magnitude of" refer to values that differ by at most a factor of ten. A "period-of-day identifier" does not merely identify a moment in time but also an interval having a generally accepted meaning and shorter than 24 hours ("night" or "lunchtime," e.g.). A "photograph" as used herein includes a watermarked or otherwise modified (with timestamps or other annotations, e.g.) digital expression of shape at least partly based on one or more cameras as well as raw data manifesting other types of optical-sensor-based images (from a charge-coupled device, e.g.) in a still frame or streaming video.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1:
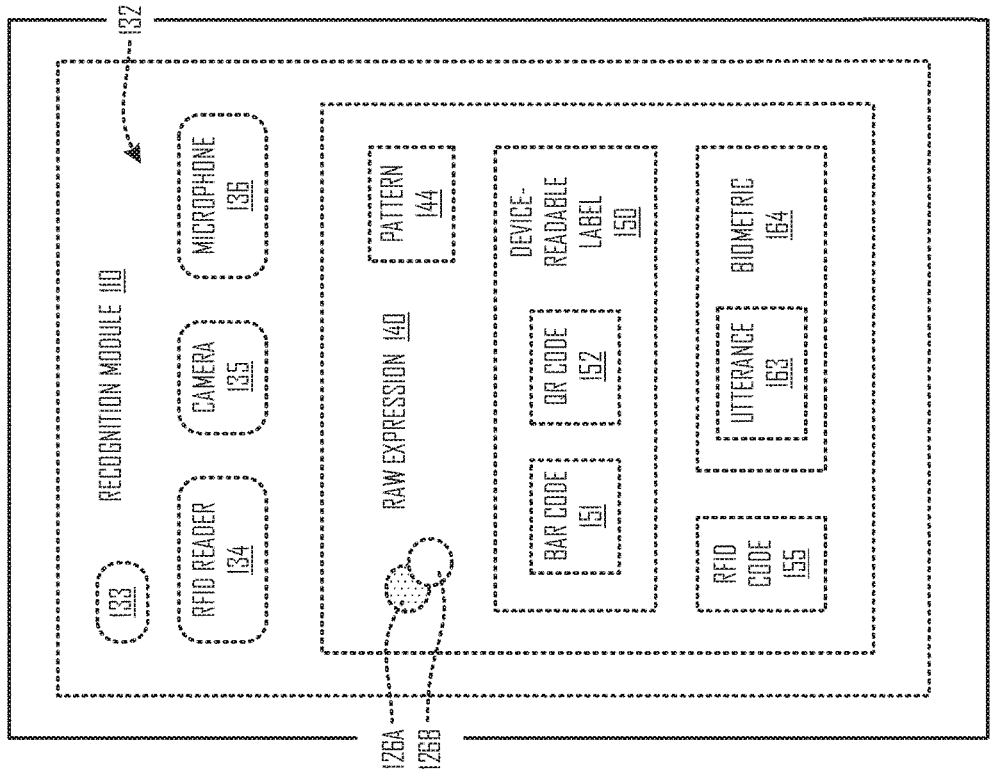
FIG. 1 depicts a system featuring one or more sensors in which one or more improved technologies may be incorporated.

FIG. 1 illustrates transistor-based circuitry 100 (implementing event-sequencing digital logic, e.g.) configured as one or more (instances of) recognition modules 110 that receive signals from one or more instances of sensors 132 (such as accelerometers 133, radio frequency identification (RFID) readers 134, camera 135, or microphones 136, e.g.) and look for patterns therein. Such "raw" expressions 140 of informational data may include one or more instances of device-readable labels 150 (bar codes 151 or QR codes 152, e.g.), wirelessly transmitted RFID codes 155, biometrics 164 (such as faces, fingerprints, retinal configurations, or utterances 163, e.g.), or other elements 126A-B that can be processed for any machine-recognizable digital patterns 144 (i.e. "scanned" for matches or absences thereof) as described below. As used herein a "scan" refers to an observation in which one or more subjects is recognized successfully.

Pattern recognition circuitry as described herein may comprise an event-sequencing structure generally as described in U.S. Pat. Pub. No. 2015/0094046 but configured as described herein. Such circuitry may include one or more instances of modules configured for local processing, for example, each including an electrical node set upon which informational data is represented digitally as a corresponding voltage configuration. In some variants, moreover, an instance of such modules may be configured for invoking such local processing modules remotely in a distributed implementation. Event detection circuitry as described herein may likewise include one or more instances of modules configured for programmatic response as described below, for example, each including an electrical node set upon which informational data is represented digitally as a corresponding voltage configuration. In some variants, an instance of modules may be configured for invoking such programmatic response modules remotely in a distributed implementation.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any raw expressions or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol.

In some contexts one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data. A few of the electrical nodes thereof provide external connectivity (for power or ground or input signals or output signals, e.g.) via bonding wires, not shown. Significant blocks of integrated circuitry on an integrated circuit chip include special-purpose modules (comprising a sensor or other hard-wired special-purpose circuitry as described below, e.g.); and different structures of memory (volatile or non-volatile, e.g.) interlinked by numerous signal-bearing conduits (each comprising an internal node, e.g.) and otherwise configured as described below. As used herein "transistor-based circuitry" refers at least to very numerous transistors each having a control terminal (a gate or base, e.g.) and two end terminals linked in a network of signal-bearing conduits (forked or other serpentine signal traces, e.g.) according to intricate circuit designs like those described herein.

Although machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

FIG. 2 illustrates a client device 700A (a tablet computer, wearable, or other mobile device, e.g.) displaying a screen image 220 that includes one or more of an Upheaval™ indicator 241 (signaling a recognition of a searchable subject with movement or bright colors, e.g.), a "cancel scan" control 242 (triggering a return to a home screen, e.g.), and a "settings" control 243 (modifying user preferences, e.g.). In the particular arrangement shown a left page of a photographic image (photograph 225A or a video clip frame, e.g.) is not highlighted and a right page is highlighted (as a selected "subject" 207 of the scan, e.g.). If the "scan" control 241 is actuated with this highlighting configuration, the symbolic content of the right page (including its textual or other symbols or sequences thereof, e.g.) may be processed (through optical character recognition, e.g.) which can then become the content of or basis for a pre-population protocol as described below (or both). If the camera pans leftward relative to subject 207 (by moving the book rightward, e.g.) a centermost position of the photographic frame will fall upon the left page instead, and an ensuing "scan" control actuation may scan/process the content 208 thereof instead. Alternatively or additionally, in some variants a non-visual aspect of the subject (a wireless signal or audible utterance 163 at the same location at about the same time, e.g.) may modulate the search (with a visual element as a search expression, e.g.) to obtain various permutations of pre-population elements as exemplified below.

Figure 3:
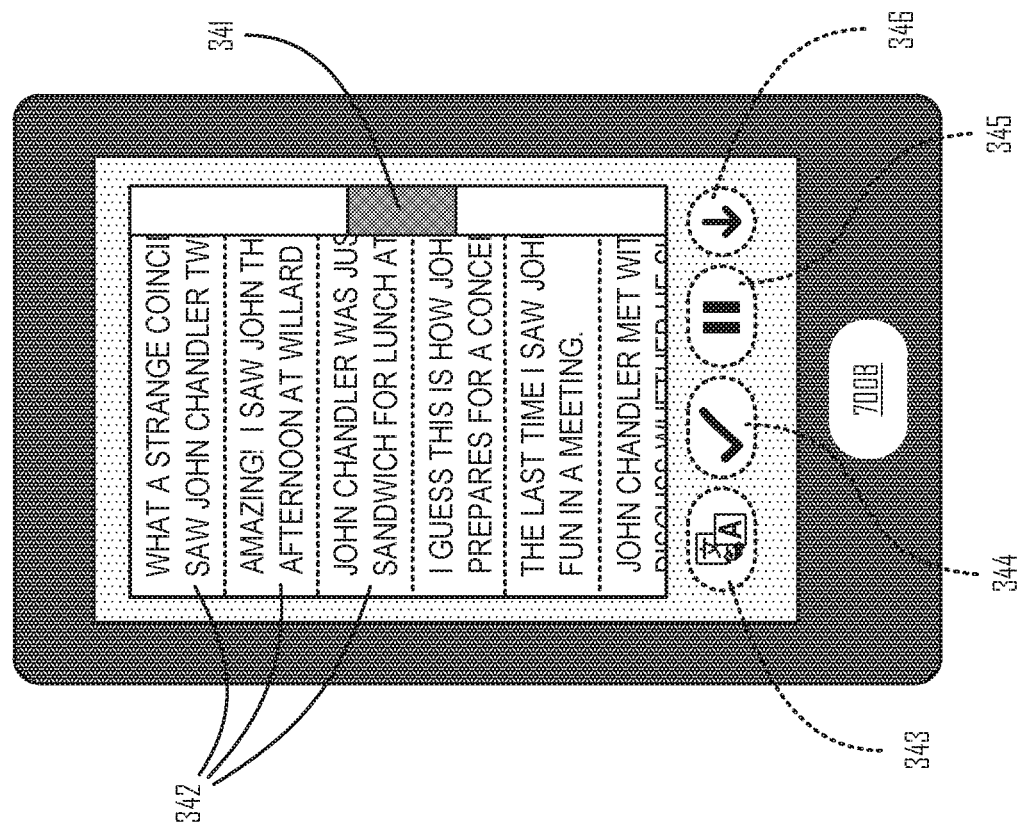
FIG. 3 depicts a client device displaying a ranked list in which one or more improved technologies may be incorporated.

FIG. 3 illustrates another (instance of a configuration of a) client device 700B displaying a screen image that includes a ranked list of pre-population candidates 342 each including one or more pre-population elements each detected within the raw expression 140 or associated with an element detected within the raw expression 140 (or both). In some variants an app as described below can scroll from a likeliest one of the candidates 342 (as ranked by a neural network of an Upheaval™ infrastructure, e.g.) down to less likely candidates 342. The user can scroll though the list by dragging a scroll button 341 thereof up or down, for example. Alternatively or additionally, one or more other controls (one or more translate controls 343, accept controls 344, pause controls 345, or index controls 346, e.g.) may be used for interacting with even a very large number of permutations of candidates (dozens or hundreds, e.g.) sorted according to up-to-date criteria based upon apparent user preferences (in profiles like those described below with reference to FIG. 12, e.g.).

Figure 4:
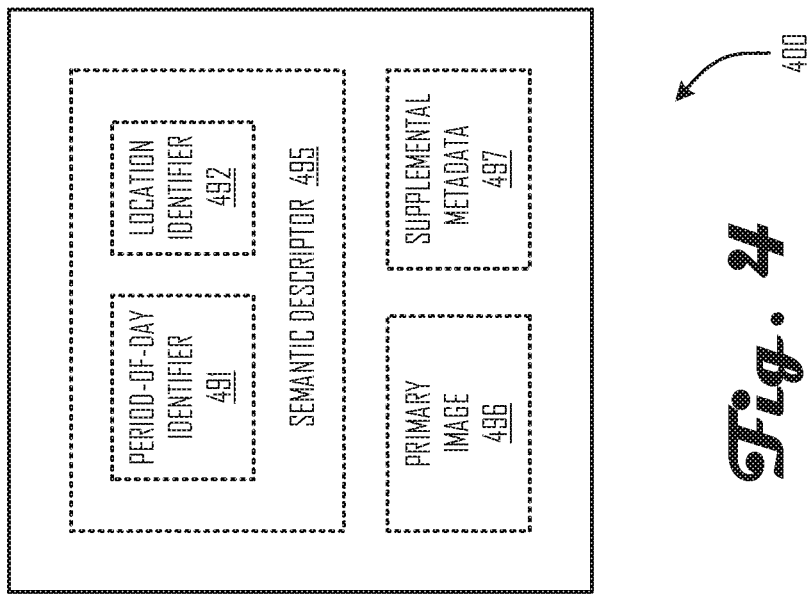
FIG. 4 depicts nonvolatile storage media in which one or more improved technologies may be incorporated.

FIG. 4 illustrates one or more nonvolatile data storage media 400 upon which output data usable as post pre-population elements may reside. Such output data may include one or more instances of semantic descriptors 495 (prepositional phrases that contextualize a period-of-day identifier 491 or location identifier 492, e.g.), of primary images 496 (comprising a photograph 225, a selected portion thereof, or a canonic image of a subject of interest thereof, e.g.), of supplemental metadata 497 (derived from related raw data or arising from structured dialogs described herein, e.g.), or of combinations thereof. Such components are a sufficiently complete set, for example, to permit a substantially automatic generation of any or all of the pre-population candidates 342 of FIG. 3 as described herein that may then be validated or otherwise corroborated by one or more crowdworkers or other users as described herein. The compound semantic descriptors there, for example, may be derived automatically from past posts, calendar data, or other suitable resources as described below.

FIG. 5 illustrates a system 500 suitable for use in at least one embodiment. A field of view 508 of a client device 700C depicts various real-world subjects 507A-B of potential interest (to user 580, e.g.), human or otherwise. Several such indications are device detectable at least as respective portions 7A-7H (each delimited by a closed color boundary, e.g.) of a photograph 225B any or all of which may be automatically highlighted, manually corroborated, and otherwise annotated as described herein during a given occasion at a single location (a meeting, e.g.). By a suitable coordination with a suitable infrastructure (resident in one or more cloud-based servers 600, e.g.) via one or more data networks 550 comprising a remote processing facility as described herein, for example, such annotated indications may in many contexts provide a sufficiently selective filtering protocol so as to allow a generation of suitable pre-population elements that a user may simply validate most of them without any editing. In some contexts such pre-population elements may be automatically combined so as to generate entire draft posts (including one or more complete sentences, e.g.), a significant fraction of which (more than 10%, in some contexts) may be of sufficient quality that one or more users 580 will validate them with no editing whatsoever.

As shown, for example, device 700C may simultaneously display an entire photograph 225B in which a single subject is selected (by user 580 subtly repositioning device 700C, e.g.) so that portion 7B—depicting a face—is highlighted. User 580 may then activate a suitable command (a voice command or actuation of control 541 as shown, e.g.) to initiate a scan screen by which the app detects a subject and upon that detection triggers a lookup of that subject (from storage resources of server 600 or from available online information, e.g.). A collection of information about the subject, along with other relevant information, is thereby responsively returned to device 700C (over an encrypted connection, e.g.).

FIG. 6 illustrates several components of an exemplary server 600. In some embodiments, server 600 may include many more components than those shown in FIG. 6. However, it is not necessary that all of these generally conventional components be shown in order to disclose an illustrative embodiment. As shown in FIG. 6, server 600 includes a data network interface 606 for connecting via a data network 550 (to one or more client devices 700 as described herein, e.g.).

Server 600 may also include one or more instances of processing unit 602, a memory 604, display hardware 612, all interconnected along with the network interface 606 via a bus 616. Memory 604 generally comprises a random access memory ("RAM"), a read only memory ("ROM"), and a permanent mass storage device, such as a disk drive.

Memory 604 may likewise contain an operating system 610, hosting application 614, and download service 624 (for downloading apps, e.g.). These and other software components may be loaded from a non-transitory computer readable storage medium 618 into memory 604 of the server 600 using a drive mechanism (not shown) associated with a non-transitory computer readable storage medium 618, such as a floppy disc, tape, DVD/CD-ROM drive, flash card, memory card, or the like. In some embodiments, software components may also be loaded via the network interface 606, rather than via a computer readable storage medium 618. Special-purpose circuitry 622 may, in some variants, include some or all of the event-sequencing logic described herein.

FIG. 7 illustrates several components of an exemplary client device 700. In some embodiments, client device 700 may include many more components than those shown in FIG. 7. However, it is not necessary that all of these generally conventional components be shown in order to disclose an illustrative embodiment. As shown in FIG. 7, client device 700 includes a data network interface 706 for connecting via one or more data networks 550 (with social media platforms 590 via server 600 or other infrastructure described herein, e.g.).

Client device 700 may also include one or more instances of processing unit 702, a memory 704, display hardware 712, all interconnected along with the network interface 706 via a bus 716. Memory 704 generally comprises a random access memory ("RAM"), a read only memory ("ROM"), and a permanent mass storage device, such as a disk drive.

Memory 704 may likewise contain an operating system 710, web browser 714, and local app 724 (obtained via download service 624, e.g.). These and other software components may be loaded from a non-transitory computer readable storage medium 718 into memory 704 of the client device 700 using a drive mechanism (not shown) associated with a non-transitory computer readable storage medium 718, such as a floppy disc, tape, DVD/CD-ROM drive, flash card, memory card, or the like. In some embodiments, software components may also be loaded via the network interface 706, rather than via a computer readable storage medium 718. Special-purpose circuitry 722 may, in some variants, include some or all of the event-sequencing logic described herein.

FIG. 8 illustrates a data flow 800 with an exemplary series of events (communications or other processes, e.g.) suitable for use with at least one embodiment. In some variants of the above-described methods, for example, an app install 806 (of app 724, e.g.) is downloaded from an Upheaval™ infrastructure 830 and implemented so as to create a unique device-app pairing 816 identified (by a model and serial number of the device with a unique identifier of the app/version, e.g.) within the infrastructure (in association with a user profile, e.g.). Thereafter when an indication 823 of a real-world subject 807 of interest (an RFID code 155 or photographic image thereof, e.g.) is obtained and scanned, in some contexts one or more parts of the scan (portions 7B or 7F having a facelike shape, e.g.) of inferred particular interest to the user 580 are identified at targeting 826.

Such portions may then be highlighted for the user 580 (via blinking or artificial outlines/coloring, e.g.) in near-real-time so as to facilitate a meaningful selection of which specific one or more indications 823 are likeliest to be the intended subject. This can occur, for example, in a context in which only portions 7A-H primarily within a center half of the photographic image (comprising photograph 225B, e.g.) are highlighted as candidates and in which such targeting includes a structured dialog with context-responsive prompts like "Please tap a portion of the image that is of greatest interest."

Responses to these queries (or a lack thereof) may constitute an annotated indication 828 usable as a search parameter in a content search (of searchable content within infrastructure 830, e.g.). In the event of no hits (an unsuccessful search 832, e.g.), a clarifying query 836 like "What is this a picture of?" may be sent to the client device (handheld 700, e.g.) and a user's reply 838 may be provided as a semantic supplement 846 upon which a broader search 851A initiated. If more than one hit ensues a result 852A is presented as a ranking 856 of hits in a concise listing like that of FIG. 3. In some variants an Upheaval™ app 724 will repeatedly auto-scroll from the likeliest candidate through the qualifying hits and then repeat. The overall length of the growing list may be signaled to a user indirectly (by a height of a scroll button 341 thereof, e.g.), for example, or directly by a visible numbering of the candidates 342 (or both). Alternatively or additionally, a "translate" control 343 may be presented by which a user may initiate a machine translation of the list of candidates 342 into another language. Alternatively or additionally, an "accept" control 344 may be presented by which a user may accept a single candidate of the list of candidates 342. Alternatively or additionally, a "pause" control 345 may be presented by which a user may cause an auto-scroll state of the list of candidates 342 to toggle into a pause state. Alternatively or additionally, a "reverse" control 346 may be presented by which a user may cause an auto-scroll direction of the list of candidates 342 to toggle into an opposite direction-of-movement state (from upward to downward, e.g.).

In response to a selection 858 from a user to whom the ranking 856 has been presented a selection supplement 866 manifesting that user input (as an actuation of "accept" control 344, e.g.) becomes a basis for a modified search 851B (one that terminates concurrent searching by which a list of candidates 342 grows, e.g.). An ensuing search result 852B may include one or more pre-population elements 876 (announced by a ringing sound or other suitable audible when presented, e.g.) upon which editing 878 (under the user's control, e.g.) may occur. A validated post 886 may then be uploaded (in response to an actuation of a "post" or "accept" control, e.g.), resulting in publication 895 to user-selected presentation venues (social media sites, e.g.) as well as private storage within infrastructure 830.

In some variants as a result of the infrastructure 830 process, semantic associations are identified and online content (patterns and user activities, e.g.) are created and refined. In some variants such refinement may take the form of content feeds, web pages, or mobile feeds. Alternatively or additionally, such online content may be based on posts and metadata provided by user scans, by additional user posts, or by user engaging directly with online content (rather than going through an Upheaval™ app 724 and scanning).

Multiple feeds may be created by an Upheaval™ infrastructure 830, and such feeds may use content that overlaps. In some variants online content feeds may be based on an individual subject, by a category of subject, by events, by locations, by timelines, by "thumbs up" votes by users, or by trending scans.

Users can interact with online content feeds, including posting comments, or adding content in other ways. Users who engage with posts from other users can use similar interests (or observed scans) to initiate "connection requests" that establish social connections between Upheaval™ users. In some variants online content may include canonic subject definitions, images, or metadata. In some variants member users may contribute to such canonic subject definitions, images, and metadata, and earn "reputation points" for contributions that the community finds valuable, useful, or correct.

In some variants users may also "Follow" online content feeds, "connected users", or subjects, to get Upheaval™ app notifications or other communications about updates to online content feeds.

In some variants such infrastructure 830 protocols may include collecting user ratings of subjects, online content, and posts. When interacting with subjects, either in an Upheaval™ app or with online content, users may assign "Ups" (up ratings) to subjects to assign a positive rating. In some variants an infrastructure 830 logs, associates, manages, and analyzes Ups/up ratings for subjects to create a dynamic assessment of favorability, popularity, or usefulness of subjects. The infrastructure 830 may then assign an "Up-ness" rating for the subject, which is dynamically adjusted over time based on activity, additional ratings, or a lack of recent ratings.

In some variants two or more factors may influence the weight a given Up rating has on a given subject. For example, the first time an Upheaval™ user gives a product an Up rating has more weight than subsequent Ups that same user gives to the same subject. In some variants the process of Up ratings may also depend upon the frequency of Ups, the time between Ups, or how many of a user's "Connected users" may have given the subject Up ratings.

In some variants users who have an Upheaval™ account may engage in an online community of app users and online content visitors. The infrastructure 830 may use a point-based system to award users points based on their scan activity, online content engagement, or their number of connected user counts.

In some variants users who are active contributors on online content pages may gain points through a community recognition process in response to moving through levels identifying engagement, frequency of scans, or online posts. Alternatively or additionally they may gain badges for contributions from scans, posts, online contributions, or activities. Alternatively or additionally they may gain badges for being recognized by other Upheaval™ users to have expertise about one or more categories of subjects by a community recognition process, which may include Ups and "expert rating" recognition. Alternatively or additionally they may be recommended by users based on expertise, user connections, or online contributions, one or more of which may be presented to users interacting with the online content based on geography, time, or ephemeral events.

An Upheaval™ community recognition process may (in some variants) use scans, profiles, online content contributions, analytics, semantic connections, and other inputs to determine the "Up-ness" of subjects, users, or subject categories (an aggregated or semantic-based subject hierarchy).

In some variants Upheaval™ processes (in an app 724 or infrastructure 830, e.g.) may be used to determine semantic associations with similar subjects that might be of interest to a user or users. Such processes may use this information to provide purchase links for one or more scanned subjects that may also be of interest to a user based on those processes, based on an affiliate purchasing process. In some variants an affiliate purchasing process allows users to purchase "subject" products/services (if applicable and appropriate) through retailers, outlets, or other sellers with which/whom Upheaval™ has an affiliate purchasing agreement.

Figure 9:
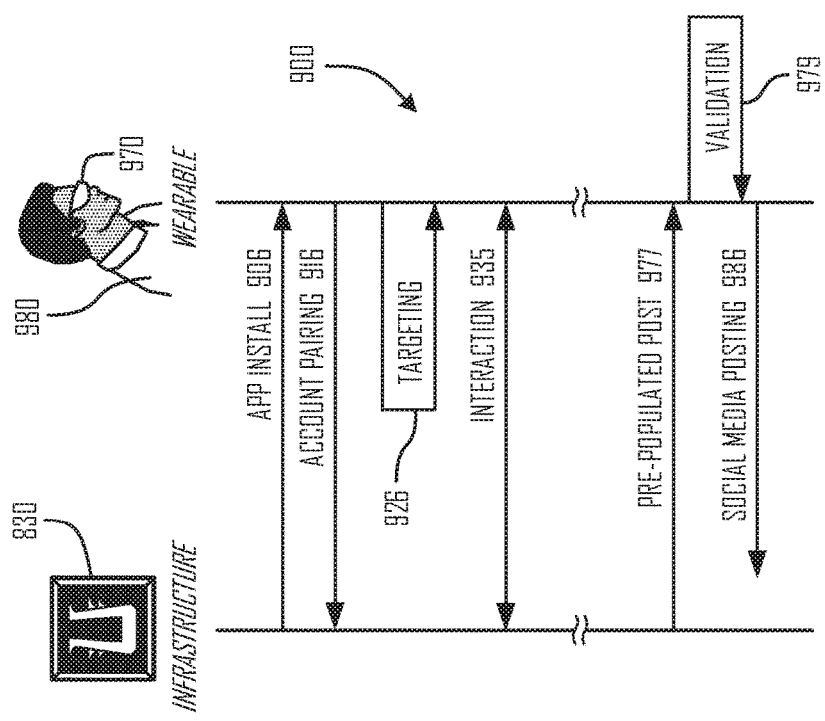
FIG. 9 depicts another data flow in which one or more improved technologies may be incorporated.

FIG. 9 illustrates another data flow 900 with an exemplary series of events (communications or other processes, e.g.) suitable for use with at least one embodiment. In some variants of the above-described methods, for example, an app install 906 (of app 724, e.g.) is downloaded from an (instance of an) Upheaval™ infrastructure 830 and implemented so as to create a unique user account pairing 916 identified (by a unique username, e.g.) within the infrastructure 830 (in association with a profile of a user 980 of a wearable 970 or other instance of client device 700, e.g.). Thereafter when an indication 823 of a real-world subject 207, 507, 807 (a person/thing/event or photographic image thereof, e.g.) is obtained and scanned, in some contexts one or more parts of the scan of (inferred) particular interest are identified at targeting 926 and resolved to a single target during a structured dialog or other enriched interaction 935 (as variously exemplified herein, e.g.).

In some variants a likeliest pre-populated post 977 is then presented via a client device (wearable 970, e.g.) one at a time, each of which the user may then reject as many times as appropriate until an acceptable one meets with user validation 979 and is then transmitted as one or more counterpart social media postings 986 (via infrastructure 830 with destination-specific filtering tailored to each social media destination, e.g.). This can occur, for example, in a context in which significant editing and menu navigation would be unduly burdensome but in which yes-or-no signals (i.e. Boolean decisions as raw user input) are viable in near-real-time (while the user is still on location and within an hour of the scan, e.g.).

In light of teachings herein, numerous existing techniques may be applied for configuring special-purpose circuitry or other structures effective for pattern recognition, estimation, digital object migration, or other tasks as described herein without undue experimentation. See, e.g., U.S. Pat. No. 10,362,058 ("Secure and scalable data transfer using a hybrid blockchain-based approach"); U.S. Pat. No. 10,135,607 ("Distributed ledger interaction systems and methods"); U.S. Pat. No. 9,606,363 ("Head mounted device (HMD) system having interface with mobile computing device for rendering virtual reality content"); U.S. Pat. No. 9,603,569 ("Positioning a wearable device for data collection"); U.S. Pat. No. 9,603,123 ("Sending smart alerts on a device at opportune moments using sensors"); U.S. Pat. No. 9,603,090 ("Management of near field communications using low power modes of an electronic device"); U.S. Pat. No. 9,602,956 ("System and method for device positioning with Bluetooth"); U.S. Pat. No. 9,576,213 ("Method, system and processor for instantly recognizing and positioning an object"); U.S. Pat. No. 9,569,439 ("Context-sensitive query enrichment"); U.S. Pat. No. 9,466,014 ("Systems and methods for recognizing information in objects using a mobile device"); U.S. Pat. No. 9,288,450 ("Methods for detecting and recognizing a moving object in video and devices thereof"); U.S. Pat. No. 9,275,299 ("System and method for identifying image locations showing the same person in different images"); U.S. Pat. No. 9,173,567 ("Triggering user queries based on sensor inputs"); U.S. Pat. No. 9,152,860 ("Methods and apparatus for capturing, processing, training, and detecting patterns using pattern recognition classifiers"); U.S. Pat. No. 9,074,906 ("Road shape recognition device"); U.S. Pat. No. 9,025,022 ("Method and apparatus for gesture recognition using a two dimensional imaging device"); U.S. Pat. No. 9,020,252 ("Image recognition method and image recognition system"); U.S. Pat. No. 8,781,995 ("Range queries in binary decision diagrams"); U.S. Pat. No. 8,774,504 ("System for three-dimensional object recognition and foreground extraction"); U.S. Pat. No. 8,763,038 ("Capture of stylized TV table data via OCR") U.S. Pat. No. 8,635,015 ("Enhanced visual landmark for localization"); U.S. Pat. No. 8,289,390 ("Method and apparatus for total situational awareness and monitoring"); U.S. Pat. No. 7,733,223 ("Effectively documenting irregularities in a responsive user's environment"); U.S. Pat. No. 7,077,323 ("Bar code recognizing method and decoding apparatus for bar code recognition"); U.S. Pub. No. 2013/0173305 ("Evidence-based healthcare information management protocols"); and U.S. Pub. No. 20120221687 ("Systems, Methods and Apparatus for Providing a Geotagged Media Experience"). These documents are incorporated herein by reference to the extent not inconsistent herewith.

Figure 10:
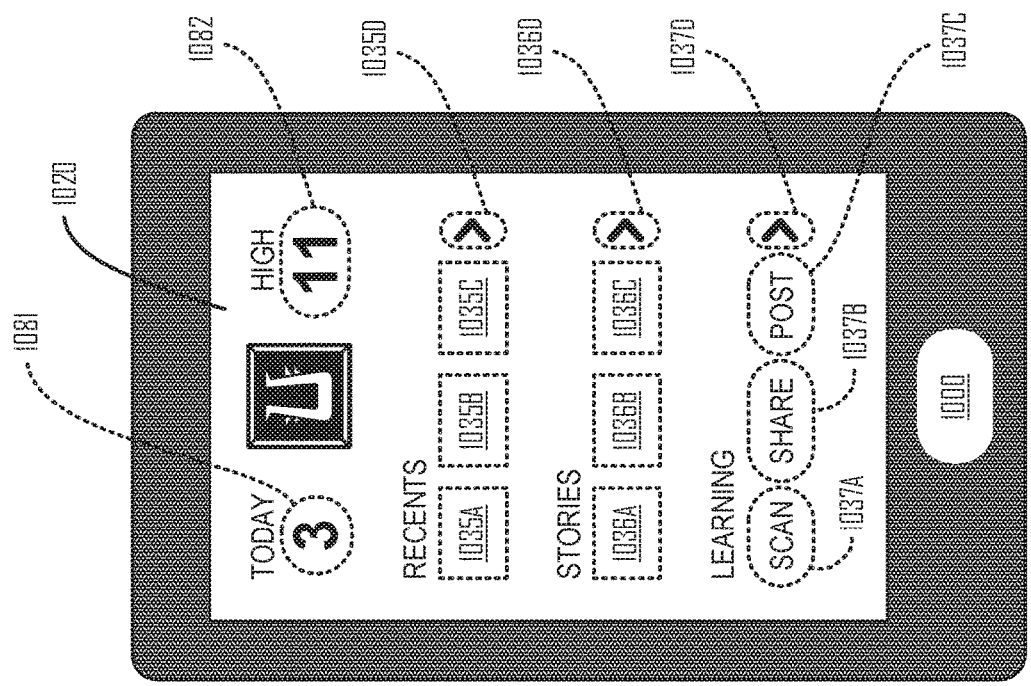
FIG. 10 depicts client device displaying controls in which one or more improved technologies may be incorporated.

FIG. 10 illustrates another client device 1000 (as an instance of device 700, e.g.) displaying a screen image 1020 usable as a home screen (displayed upon app initiation or in response to a social media posting 986, e.g.). In some variants, for example, such a screen image 1020 may be displayed as a conditional response to a period of idleness that exceeds a given threshold (on the order of 1 minute or of 5 minutes, e.g.). Alternatively or additionally, screen image 1020 may include one or more of a daily performance metric 1081 (a current count of successful Ups/scans on a given day, e.g.) or a weekly performance metric 1082 (a current count of successful Ups/scans in a given week, e.g.) for a given pairing.

A section of a home screen (as depicted in screen image 1020, e.g.) may display buttons 1035A-C that identify the most recent scans performed by the user as well as one or more buttons 1035D to make other such buttons become visible (by scrolling through them, e.g.). Alternatively or additionally, the screen may provide buttons 1036A-C that identify the most recent content (stories, e.g.) as well as one or more buttons 1036D to make other such buttons become visible (by scrolling through them, e.g.). Alternatively or additionally, the screen may provide one or more buttons 1037A to implement a scan, one or more buttons 1037B to share information about the app (or to get codes that could subsequently be scanned by the app), one or more buttons 1037C to post content (to other social media platforms 590, e.g.), or one or more buttons 1037D to make other such buttons become visible (by scrolling through them, e.g.).

FIG. 11 depicts an exemplary operational flow 1100 incorporating one or more technologies. Operation 1110 describes discerning a set of one or more distinct physical items or real-world events (or both) from one or more observations (of an RFID code or in a photograph or video, e.g.) obtained by a mobile device at a single location. The single location may be identified by street address or by a facility name (a name of a park or restaurant, e.g.) at which the subjects (items or people, e.g.) were depicted, for example, or at which the real-world event (a festival or an accident, e.g.) occurred.

Operation 1115 describes expressing a period-of-day during which the one or more observations were obtained and a natural language identifier of the single location. Operation 1125 describes associating a tentative semantic descriptor (a place name or product name, e.g.) with some or all of the one or more observations. Operation 1130 describes presenting content matching the tentative semantic descriptor of the one or more distinct physical items. Operation 1135 describes receiving from a user a corroborated semantic descriptor of the one or more distinct physical items. Operation 1145 describes pre-populating a draft post with the corroborated semantic descriptor of the one or more distinct physical items with the period of the day and the natural language identifier of the single location at which the mobile device obtained the one or more observations all together with a graphical depiction of the one or more distinct physical items (a photograph or video clip, e.g.). Operation 1150 describes providing the user an opportunity to edit the draft post. Operation 1160 describes transmitting the draft post to one or more social media sites/platforms selected by the user.

Figure 12:
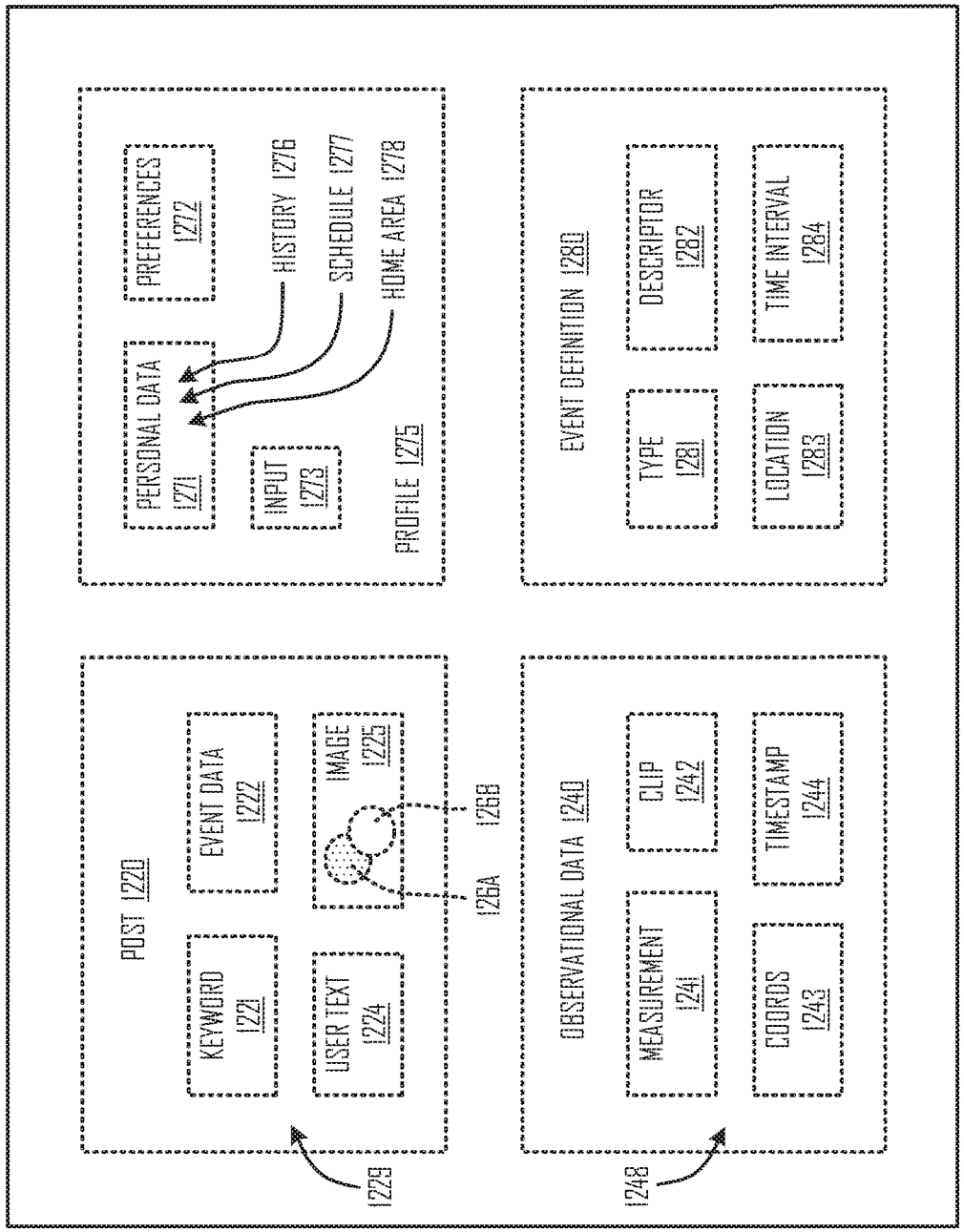
FIG. 12 depicts a pre-population module in which one or more improved technologies may be incorporated.

FIG. 12 depicts a pre-population module 1200 that may (optionally) include one or more instances of posts 1220; of profiles 1275; of observational data 1240; of event definitions 1280; or of combinations of these as further described below. As shown posts 1220 may each include one or more instances of keywords 1221; of event data 1222; of user text 1224; of images 1225 (and components 126A-B thereof); or of various contents of editing fields 1229. As shown profiles 1275 may each include one or more instances of personal data 1271 such as histories 1276, schedules 1277, or of home areas 1278; of preferences 1272; or of inputs 1273. As shown observational data 1240 may include one or more instances of measurements 1241 or other raw expressions 140; of audio or video clips 1242; of GPS coordinates 1243 (e.g. manifesting a capture location); or of timestamps 1244 or other capture information 1248. As shown event definitions 1280 may each include one or more instances of types 12281; of descriptors 1282; of locations 1283; of time intervals 1284; or of combinations of these.

Figure 13:
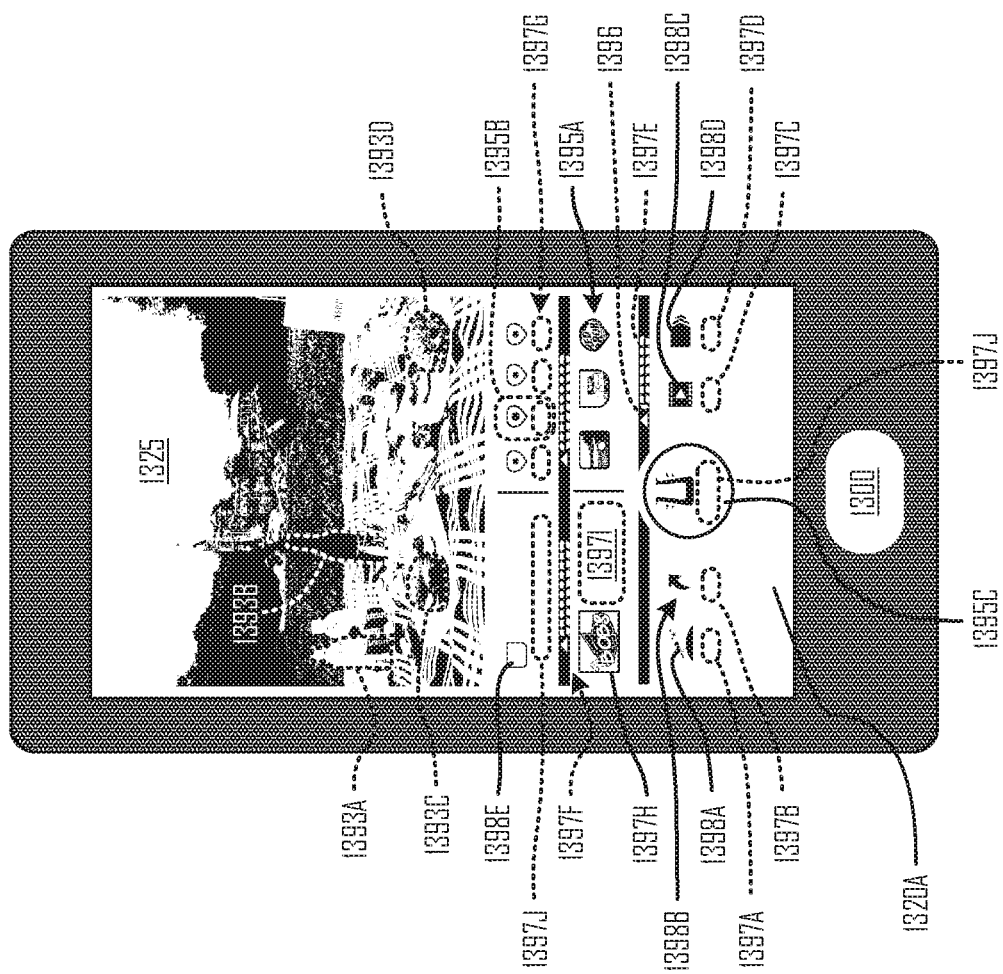
FIG. 13 depicts a client device displaying a screen image usable in an observation-scanning mode in which one or more improved technologies may be incorporated.

FIG. 13 depicts another client device 1300 (as an instance of device 700, e.g.) displaying a screen image 1320A usable in an observation-scanning mode (displayed upon activation of a "SCAN" button 1037A, e.g.). In some variants, for example, such a screen image 1320A may be displayed when client device 1300 arrives at a facility of particular interest and as a prelude to a recognized-element-selection mode like that described herein (with reference to FIG. 14, e.g.). In an observation-scanning mode, output from one or more sensors 132 (such as a camera 135 or microphone 136, e.g.) of client device 1300 may be presented (as a photograph 1325 or clip, e.g.) so that a user 580, 980 can confirm that one or more machine-recognizable object depictions 1393A-D (e.g. respectively depicting water bottles, a wine, sandwiches, or utterances) are detectable by (one or more sensors 132 of) client device 1300.

Within screen image 1320A is shown a "discover/explore" icon 1398A (depicting a telescope, e.g.) and a corresponding label 1397A. Also screen image 1320A may depict a "share app" icon 1398B (depicting an upward-swooping arrow, e.g.) and a corresponding label 1397B. Also within screen image 1320A is shown a "how-to" icon 1398C (depicting a video clip control, e.g.) and a corresponding label 1397C. Also within screen image 1320A is shown a "following" icon 1398D (depicting a rightward-pointing shape grouping, e.g.) and a corresponding label 1397D. As depicted and described below, one or more of these labels 1397A-D respectively identify user-actuated controls.

Such screen images may likewise include one or more (instances of) textual instruction labels 1397E (displaying "previous scans" with an up-pointing triangle 1396, e.g.) signaling that the symbols to which label 1397E is adjacent are user-actuated controls 1395A configured to trigger a retrieval of a prior scan result. Such screen images may likewise include one or more textual instruction labels 1397F (displaying "tap to begin," e.g.) signaling that the symbols to which label 1397F is adjacent (including a physical-object-indicative icon 1398E, e.g.) are user-actuated controls 1395A configured to trigger a scan of a corresponding type.

Such screen images may likewise include one or more location-specifying labels 1397G (displaying a size-monotonic sequence of natural language place names, e.g.). Such labels may progress from "Lake Stevens Park" and "Lake Stevens City" to "Western Washington" and "USA" as a left-to-right expanding sequence, for example, or vice versa. This can occur, for example, in a context in which a label 1397G that refers to a largest geographic region that does not contain a home area 1278 of the user 580, 980 is used as a default (for generating an event descriptor 1282, e.g.). In some variants, for example, the largest natural language place names provided in the sequence identify a nation, state, county, prefecture, or other region having a centralized government. Alternatively or additionally, a currently-active selected location control 1395B may identify a particular large or small geographic region that contains the location associated with the observational data 1240 (identified by GPS coordinates 1243, e.g.) being processed ("scanned"), which may provide an enriched commercial context upon which a sponsor-identifying label 1397H (logo, e.g.) or ad copy label 1397I may depend. Moreover in some contexts such screen images may include one or more status-indicative labels 1397J (displaying "searching for codes" or the like) signaling that scanning is in progress. Also in some contexts, such screen images may include a scan initiation control 1395C containing an appropriate label 1397J ("detect from image," e.g.) signaling that (if enabled) the control is configured to trigger processing as described herein.

Figure 14:
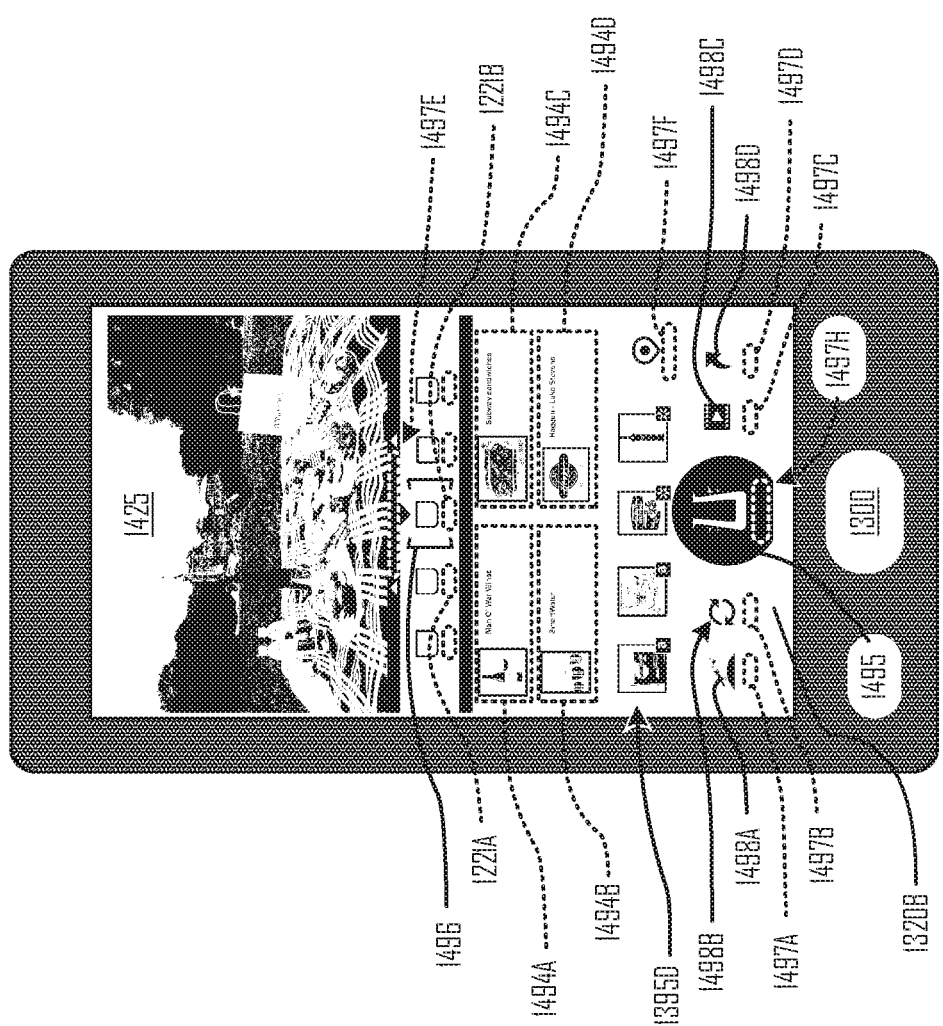
FIG. 14 depicts the client device of FIG. 13 in another state in which one or more improved technologies may be incorporated.

FIG. 14 depicts another state of the client device 1300 of FIG. 13 displaying a screen image 1320B usable in a keyword-selection mode (after scanning to detect elements, and representing detected element as keywords 1221, e.g.). In some variants, for example, such a screen image 1320B may be displayed when client device 1400 has processed observational data 1240 at a particular site enough to obtain a plurality of keywords 1221A-B associated with items of (nominally) apparent interest to a user. After image processing identifies several keywords 1221, a designation is made (by a machine learning module, e.g.) of which two or more keywords 1221 are likeliest to be used in an acceptable post (given a history 1276 of a user, a location-specifying label 1397G, the framing of the photograph or video, or other such available indicia, e.g.). In a context in which a detected element represented by keyword 1221A of "water bottle" is prioritized somewhat below a detected element represented by keyword 1221B of "wine" as an initial (default) ranking of likely elements of interest, for example, the highest-ranking keyword 1221B may be identified by one or more selection-indicative referent symbols (brackets, e.g.). This may occur, for example, in a context in which a frame of the photograph 1325 is cropped (as a subset or superset of photograph 1325, e.g.) to include or magnify the object depictions 1393 associated with the particular keywords 1221 simultaneously displayed in image 1320B. Zooming out as shown from photograph 1325 to photograph 1425, for example, will be appropriate if the displayed keywords 1221 include "blanket." Or if the keywords identify an event like "picnic," for example, a photograph 1425 with appropriate framing may preferably be selected to depict all physical objects (including the blanket) with which the event is apparently associated.

Within screen image 1320B is shown a "discover/explore" icon 1498A (depicting a telescope, e.g.) and a corresponding label 1497A. Also screen image 1320B may depict an "ad content cycle" icon 1498B and a corresponding label 1497B. Also within screen image 1320B is shown a "how-to" icon 1498C (depicting a video clip control, e.g.) and a corresponding label 1497C. Also within screen image 1320B is shown a "share app" icon 1498D (depicting a rightward-pointing shape grouping, e.g.) and a corresponding label 1497D. As depicted and described below, one or more of these labels 1497A-D respectively identify user-actuated controls.

Such screen images may likewise include one or more (instances of) textual instruction labels 1497E (displaying "move and zoom to your subject" with one or more up-pointing triangles 1396, e.g.) signaling that the symbols to which label 1497E refers are user-actuated controls 1395 configured to trigger panning and zooming (via conventional touchscreen controls, e.g.). Such screen images may likewise include a selected-location-identifying label 1497F confirming the now-active natural language location identifier (a location label 1397G, e.g.).

Such screen images may likewise include one or more sponsored content zones 1494A-D (containing ads selected in response to a category of the event or location, e.g.). In some contexts, for example, such a zone 1494A may include a canonic image of an automatically recognized element (a stock photo of a wine bottle, e.g.). Alternatively or additionally such screen images may include one or more provider-selection controls 1395D by which a user may order products (in response to a category of the event or location, e.g.).

Also in some contexts, such screen images may include a draft post generation control 1495 containing an appropriate label 1497H ("select & go," e.g.) signaling that (if enabled) the control is configured to trigger generating one or more (instances of) posts as described herein.

Figure 15:
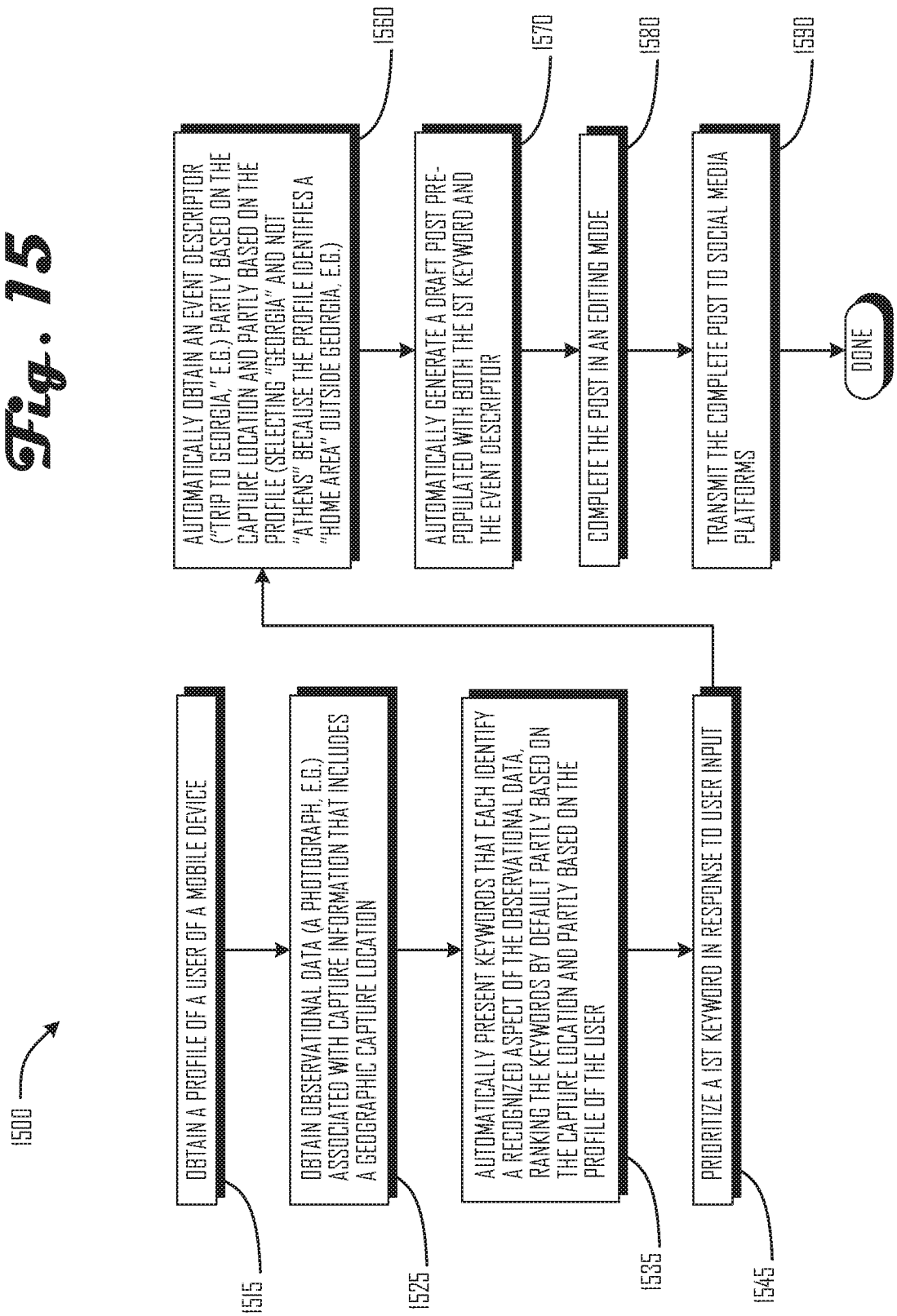
FIG. 15 depicts another operational flow in which one or more improved technologies may be incorporated.

FIG. 15 depicts an exemplary operational flow 1500 incorporating one or more technologies. Operation 1515 describes obtaining a profile of a user of a mobile device (one or more modules of special purpose-circuitry 622, 722 obtaining a profile 1275 of a user 580, 980 of a mobile device 700, 1000, 1300, e.g.).

Operation 1525 describes obtaining observational data associated with capture information that include a geographic capture location (one or more modules of special purpose-circuitry 622, 722 capturing via the mobile device observational data 1240 in association with capture information 1248, e.g.).

Operation 1535 describes automatically presenting two or more keywords that each identify a recognized aspect of the observational data, wherein the keywords are ranked by default partly based on the capture location and partly based on the profile of the user (one or more modules of special purpose-circuitry 622, 722 causing the observational data 1240 to be sent to a remote processing facility that extracts the recognized aspects and returns the keywords 1221, e.g.).

Operation 1545 describes prioritizing a first one of the keywords over one or more others in response to user input (one or more modules of special purpose-circuitry 622, 722 obtaining user input 1273 identifying which among several simultaneously-displayed ranked keywords is preferred over the default value, e.g.).

Operation 1560 describes automatically obtaining an event descriptor ("trip to Georgia," e.g.) partly based on the capture location and partly based on the user profile (one or more modules of special purpose-circuitry 622, 722 selecting a descriptor expressly relating to "Georgia" and not "Athens" even though the observational data 1240 was captured in Athens, e.g.). This can occur, for example, in a context in which the profile identifies a "home area" outside Georgia, for example, and in which system 500 is configured to generate an event that refers to a largest geographic region that does not contain a home area 1278 of the user 580, 980.

Operation 1570 describes automatically generating a draft post (one or more modules of special purpose-circuitry 622, 722 generating a post 1220 that includes a selected keyword 1221 and a default event descriptor 1282, e.g.).

Operation 1580 describes completing the post in an editing mode (one or more modules of special purpose-circuitry 622, 722 generating a complete validated post 886 by adding content from an utterance 163 or other user text 1224 to the draft post 1220, e.g.).

Operation 1590 describes transmitting a complete post to one or more social media platforms (one or more modules of special purpose-circuitry 622, 722 broadcasting the complete validated post 1220 to multiple social media platforms 590 selected by the user 580, 980, e.g.). This can occur, for example, in a context in which the complete post 1220 contains the first automatically recognized shape element 126A of the first photograph, the first representative element keyword 1221A, the first natural language event descriptor 1282, and the user text added into an editing field 1229 in response to one or more data input actions by the user 580, 980; in which the initial inclusion of such simultaneously-displayed keywords are likely to include an acceptable subject for a post but in which no acceptable subject for a post would likely be immediately visible otherwise insofar that each keyword is individually unlikely to be acceptable, and in which numerous postings having such pre-populated contextual element combinations would not be suitable for automation without synergistic hybrids of manual and automatic operations as described herein.

Figure 16:
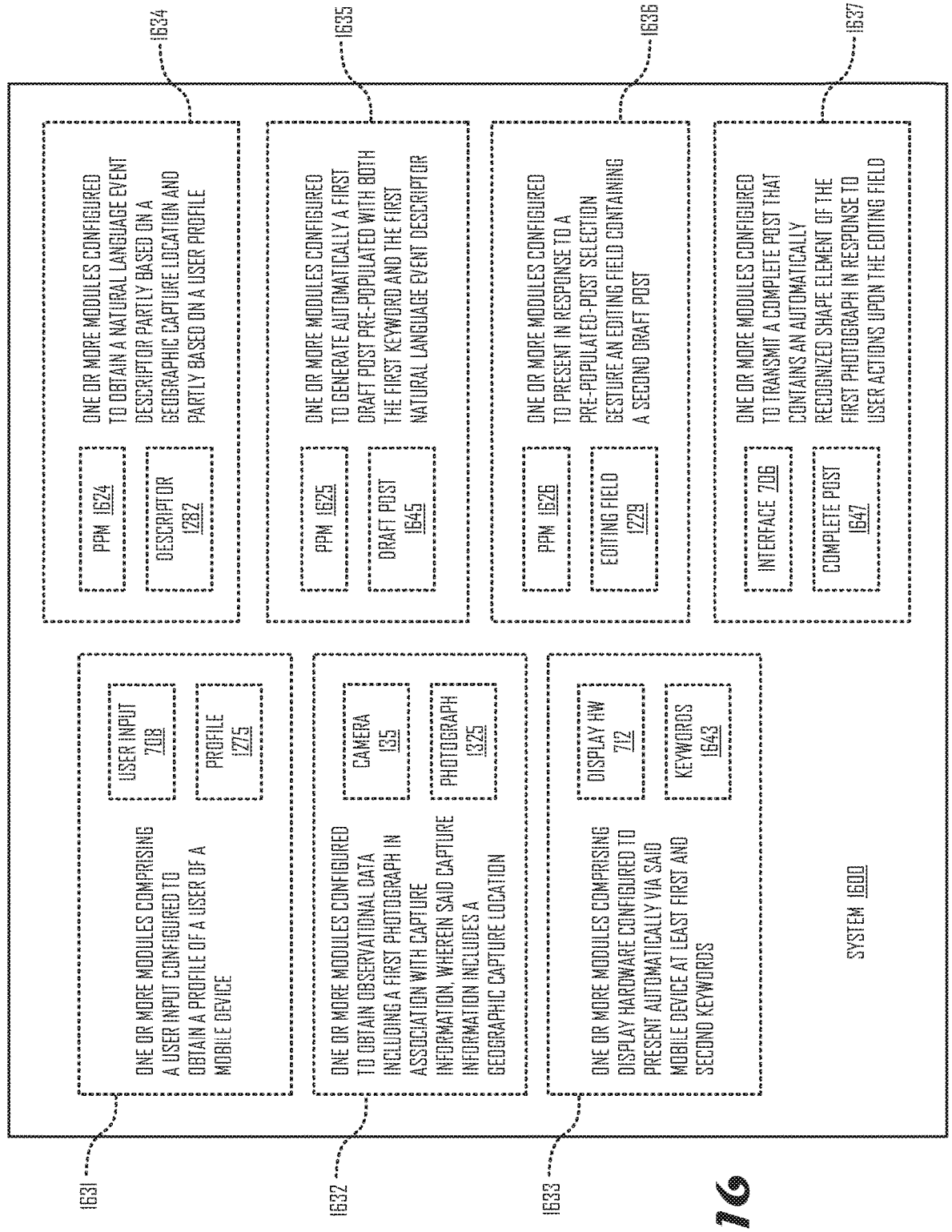
FIG. 16 depicts additional modules in which one or more improved technologies may be incorporated.

FIG. 16 depicts an arrangement of modules 1631-1637 in which one or more improved technologies may be incorporated. As shown one or more modules 1631 of system 1600 comprising a user input configured to obtain a profile of a user of a mobile device may include one or more user inputs 708 or one or more profiles 1275 (or both). One or more modules 1632 configured to obtain observational data including a first photograph in association with capture information, wherein the capture information includes a geographic capture location (e.g. defined by GPS or other coordinates), may include one or more user cameras 135 or one or more photographs 1325 (or both). One or more modules 1633 comprising display hardware configured to present automatically via the mobile device at least first and second keywords may include one or more instances of display hardware 712 or one or more keywords 1643 (or both). One or more modules 1634 configured to obtain a natural language event descriptor partly based on a geographic capture location and partly based on a user profile may include one or more pre-population modules 1624 or one or more event descriptors 1282 (or both). One or more modules 1635 configured to generate automatically a first draft post pre-populated with both the first keyword and the first natural language event descriptor may include one or more pre-population modules 1625 or one or more draft posts 1645 (or both). One or more modules 1636 configured to present in response to a pre-populated-post selection gesture an editing field containing a second draft post may include one or more pre-population modules 1626 or one or more editing fields 1229 (or both). One or more modules 1637 configured to transmit a complete post that contains an automatically recognized shape element of the first photograph in response to user actions upon the editing field may include one or more interfaces 706 or one or more complete posts 1647 (or both). It will be understood by those skilled in the art that, in some variants, the above-described modules 1631-1637 may (optionally) be implemented by configuring hardware to perform methods described herein via special-purpose software.

Figure 17:
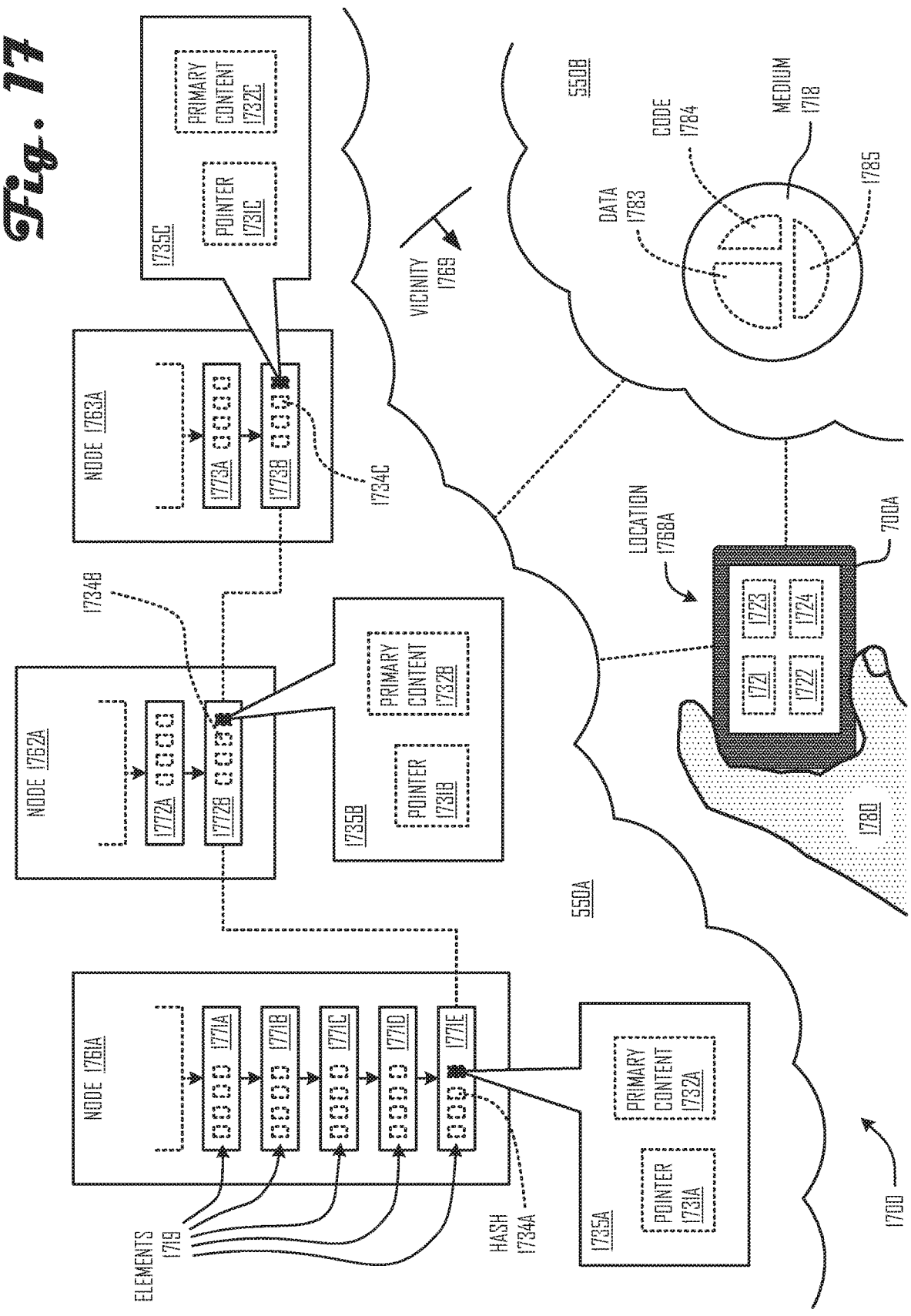
FIG. 17 depicts a system in which a client device is configured to interact with several (blockchain or other) multiblock nodes in which one or more improved technologies may be incorporated.

FIG. 17 depicts a system 1700 in which a user 1780 of a client device 700A interacts with a secure network 550A or similar entity and with one or more storage media 1718 of another network 500B (e.g. operated by a cloud storage or similar mass storage provider). As further described and exemplified herein, a blockchain or similar node 1762A owned by or representing user 1780 is cryptographically interlinked with other such nodes 1761A, 1763A owned by or representing respective others (e.g. human individuals, objects, locations, events, and so on) and residing within network 550A. As used herein each such "blockchain node" like these refers to a succession of blocks 1771-1773 that are linked using cryptography and at least partly secured against tampering.

Node 1761A, for example, contains a serial succession of blocks 1771A-E each comprising several elements 1719. A first cryptographic hash 1734A in or near a corresponding rendering 1735A protects the first rendering 1735A from tampering insofar that most or all of the content will, if altered, no longer correspond with the cryptographic hash 1734A. At least some of the renderings 1735A of node 1761A associate primary content 1732A with a pointer 1731A indicating one or more corresponding locations of image data 1783 (video clips, e.g.), computationally burdensome device-executable code 1784, or other such secondary content 1785 unsuitable for mass duplication to multiple nodes (exceeding a threshold between 2 and 20 nodes 1761-1764, e.g.), where such image data may be encrypted for security, privacy or other purposes. Node 1762A likewise contains a serial succession of blocks 1772A-B each comprising several elements 1719 in which a second cryptographic hash 1734B in or near a corresponding second rendering 1735B protects the rendering 1735B from tampering (e.g. by making any the tampering evident when validating the data by comparing a hash thereof against a baseline). At least some of the renderings 1735B of node 1762A associate primary content 1732B with a pointer 1731B indicating one or more corresponding locations of secondary content 1785. Node 1763A likewise contains a serial succession of blocks 1773A-B each comprising several elements 1719 such that a third cryptographic hash 1734C in or near a corresponding rendering 1735C protects the third rendering 1735C from tampering. At least some of the renderings 1735 of node 1763A associate primary content 1732C with a pointer 1731C indicating one or more corresponding locations of secondary content 1785. As used herein a "rendering" of a content item is a digital copy or other instance of a significant component (e.g. more than half) of the content item.

In some variants of the above-described system 1700, for example, a node-entity pairing is established within the system so as to create a unique node identifier across network 550A, and unique across other systems or networks. To further categorize and identify block content placed on such nodes, elements 1719 may contain metadata that describe some or all of the rendering's data category, its industry-specific usage or application, its industry-defined data category or activity code, or other such metadata used to categorize the rendering (i.e., a category id) for various purposes, including reconstitution of entity-specific, node-specific, category-specific, activity-specific, or industry-specific renderings.

In configuring system 1700, first user content 1721 is obtained from a user 1780 of a client device 700A. In some contexts such content 1721 may include one or more instances of event data 1222, a smart contract or other user text 1224, a video clip 1242 or other observational data 1240, a post 1220, or other event-descriptive or location-descriptive data 1222, a capture-indicative timestamp 1244 or other provenance-indicative metadata describing other parts of the user content 1721, or a combination thereof, where such renderings may be encrypted for security, privacy or other purposes. The first rendering 1735A of the first user content 1721 is written onto node 1761A and the second rendering 1735B of the first user content onto a second node 1762A, respectively protected by hashes 1734A-B that are not identical.

Earlier or roughly contemporaneously, secondary content 1785 of the first user content 1721 is recorded onto one or more storage media 718, 1718 as an automatic and conditional response partly based on one or more coordinates 1243 of a physical location 1768A of the first computing device 700A and partly based on the first user content 1721 containing or being distilled into one or more pointers 1731A-B indicating storage locations at which the secondary content 1785 will reside (e.g. directly or otherwise identifying one or more addresses on one or more archival media 718, 1718). In some variants, for example, the specific archival media 718, 1718 will be selected to be conveniently near the location 1768A at which the requesting device 700A was present at the time of capture or of upload. Alternatively or additionally, the specific archival media 718, 1718 used for storing one or more instances of the secondary content 1785 may be selected for lowest storage costs or best access by devices 700B-C of the users who respectively own the other nodes 1761A, 1763A that receive the same primary content 1732. In some variants, the recording of first user content 1721 and any other rendering of said user content may be encrypted as an automatic and conditional response partly based on the security or privacy requirements by any node participating in the rendering. By providing identical primary content 1732 in two or more respective non-identical renderings 1735A-C owned by different users, a helpful preparedness for future reconstitution of such nodes (e.g. by migration or following a catastrophic failure) is manifested, as further described below.

Such preparedness is feasible, for example, in a context in which burdensome secondary content 1785 is forbidden or in which inclusion of burdensome secondary content 1785 is subject to selective deduplication (using one or more user-defined criteria 1722, e.g.) as described herein. This can occur, for example, in a context in which client device 700A receives or transmits one or more instances of criteria 1722, of requests 1723, of authorizations 1724, or a combination thereof. In some protocols such items may be accessible to a user 1780 in real time (e.g. when one or more instances of primary content 1732, secondary content 1785, or pointers 1731 are being validated). In others such items may be accessible to a user 1780 long before the primary content 1732 is written to blocks (e.g. so that a user 1780 effectively provides one or more authorizations 1724 as an automatic and conditional response to one or more user-provided criteria 1722 in lieu of requiring any real-time user response).

Figure 18:
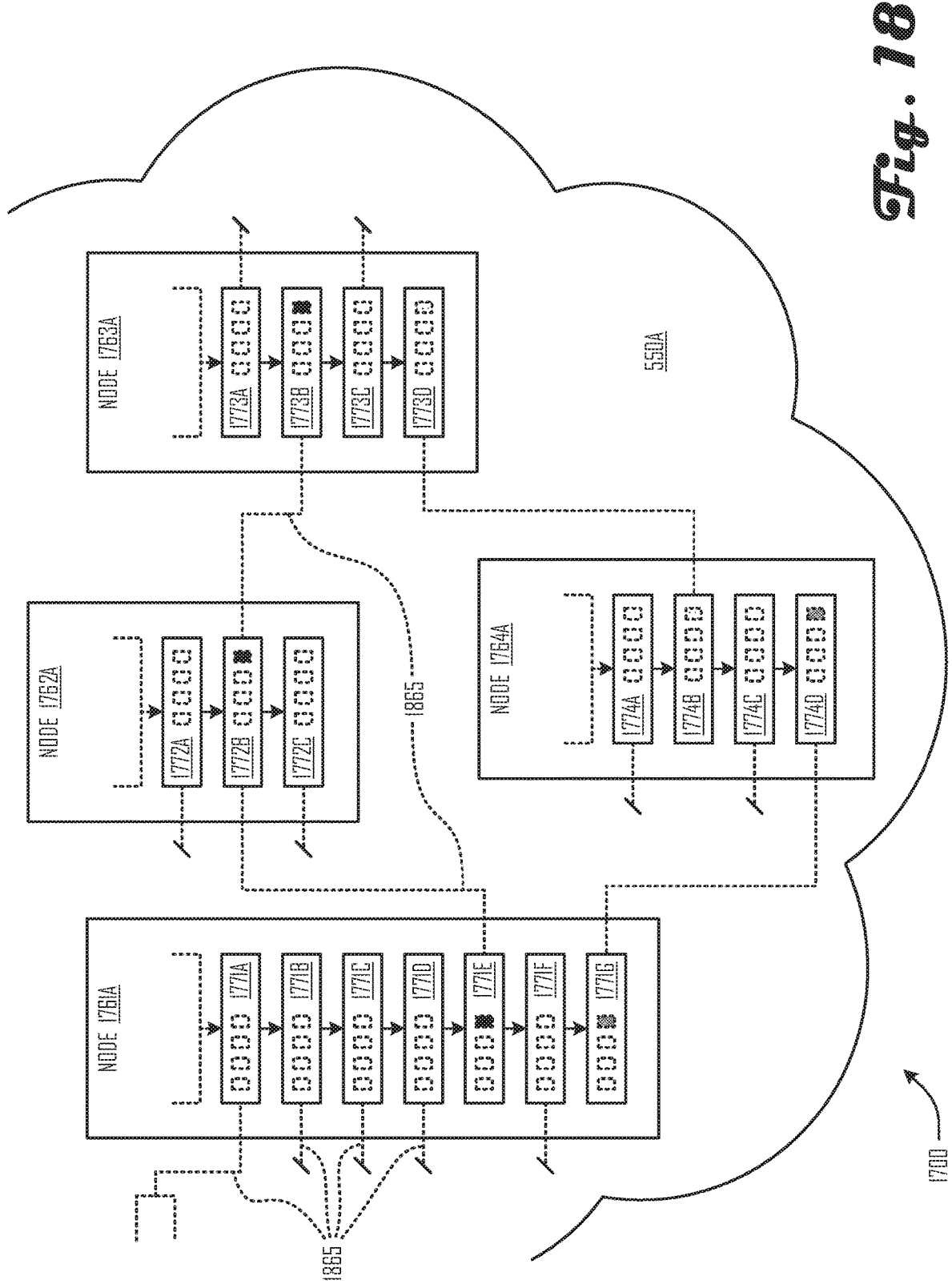
FIG. 18 depicts a later, more developed version of the system of FIG. 17 in which one or more improved technologies may be incorporated.

FIG. 18 depicts additional detail about system 1700 at a subsequent time at which additional blocks and nodes have been added. In the interim blocks 1771F and 1771G have been added to node 1761A. Block 1772C has been added to node 1762A. Blocks 1773C and 1773D have been added to node 1763A. And all of the blocks 1774A-D of node 1764A have been added to network 550A.

A "partner" block as used herein is one that apparently shares primary content 1732 and one or more linkages (e.g. particular locations or other identifiers) with the subject block. As such block 1772B has exactly two partner blocks 1771E, 1773B that both know the other's location/identity. As used herein a linkage is "open" if it identifies one or more partner blocks that are not currently available (e.g. by virtue of being nonexistent or not yet trusted). Various ways for an element 1719 of one block to identify one or more partner blocks—e.g. by name or location—will be understood from context by those skilled in the art. FIG. 18 depicts a state of network 550A that needs no reconstitution yet, so all of the linkages 1865 thereof are "closed" as depicted in the symbols presented there. "Open" linkages are shown (designated with arrows) in FIG. 24.

Figure 19:
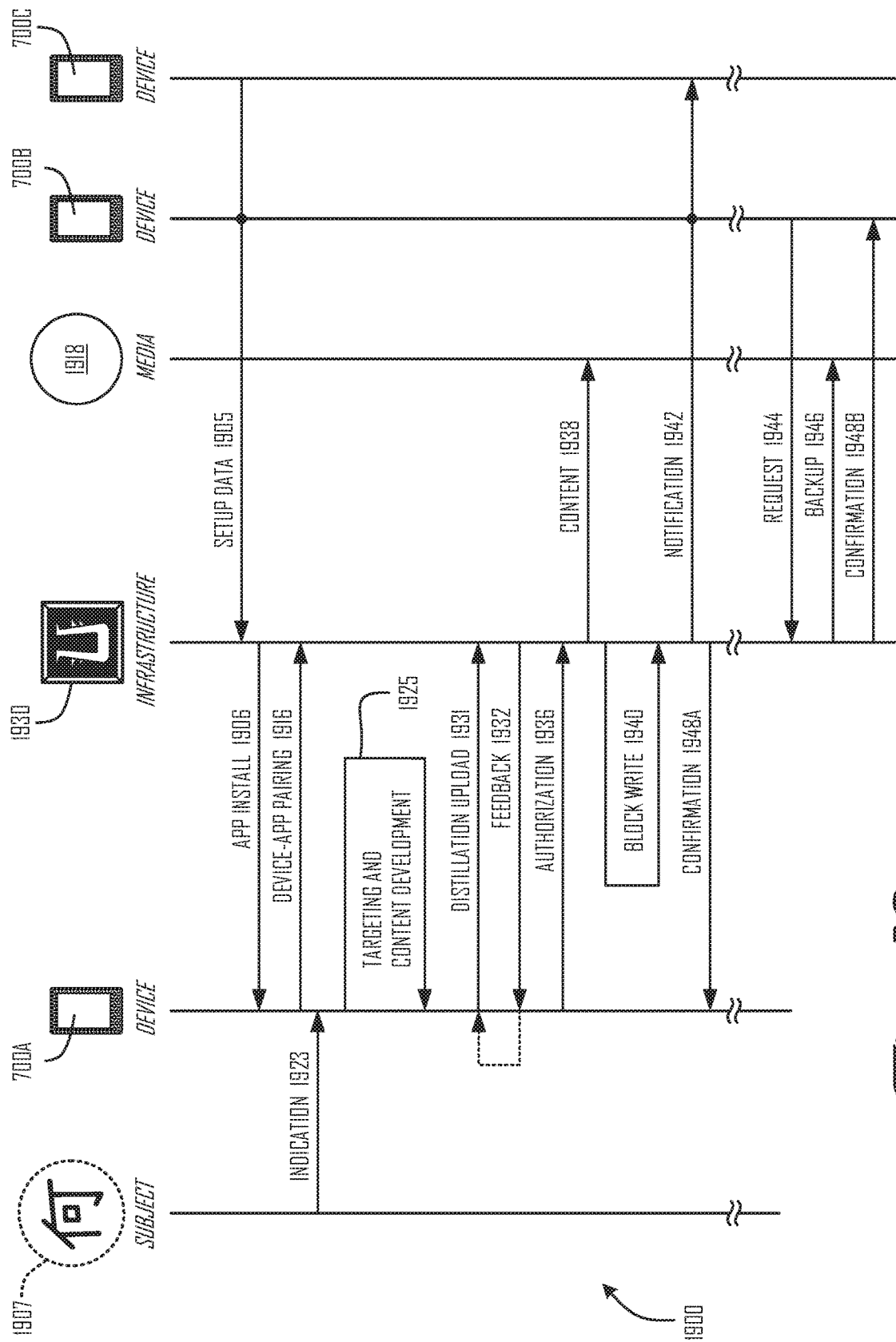
FIG. 19 depicts another data flow in which one or more improved technologies may be incorporated.

FIG. 19 illustrates a data flow 1900 with an exemplary series of events (communications or other processes, e.g.) suitable for use with at least one embodiment. In some variants of the above-described methods, for example, setup data 1905 describing node 1761A is provided via device 700B (from a user who owns/controls node 1761A depicted in FIG. 20) to an infrastructure 1930 that includes one or more servers 600 that govern network 550A. Likewise setup data 1905 describing node 1763A (e.g. by name or location) is provided via device 700C to infrastructure 1930. An app install 1906 (of app 724, e.g.) is downloaded from infrastructure 1930 and optionally implemented so as to create a unique device-app pairing 1916 identified (by a model and serial number of the device with a unique identifier of the app/version, e.g.) within the infrastructure 1930 (in association with a user profile 1275, e.g.). Thereafter an indication 1923 of user input or some other real-world subject 1907 of interest is obtained at device 700A. Targeting and content development 1925 is begun such as by a programmatic dialog with or menu selections from user 1780, incrementally resolving what should be shared and which nodes it should be shared with. User 1780 thereafter initiates a distillation upload 1931, triggering feedback 1932 about whether data filters or other applicable restrictions (e.g. imposed by recipients as setup data 1905) are satisfied. In some variants, for example, a recipient may forbid renderings 1735 that exceed a size threshold (of 5-10 megabytes, for example). Or a recipient may block some senders or impose costs for large renderings upon a sender. Or a recipient may forbid certain types of content (e.g. video data or adult content) or accept only favored types of content (e.g. those including a transaction). After one or more iterations of feedback 1932 are received and taken into account, device 700A transmits an authorization 1936 for the secondary content 1938 to e sent to one or more nonvolatile media 1918 and for a block write 1940 of matched partner blocks 1771E, 1772B, 1773B to be performed according to terms and conditions that were defined in the feedback 1932. About the same time as the block write 1940, a confirmation 1948A is sent to device 700A and a notification 1942 of the block write 1940 is sent to any devices 700B, 700C that received primary content 1732 for writing counterpart renderings 1735A, 1735C. In some variants only one instance of corresponding primary content 1732 will be written to each of the receiving blocks 1771E, 1773B. In others a particular recipient node 1763A may aggregate two or more instances of corresponding primary content (i.e. as respective elements 1719 of the receiving blocks from respective sending nodes) so as to reduce the number of blocks created by the particular recipient node 1763A.

Some time later, device 700B transmits a request 1944 that triggers a backup 1946 of (a current state of) a node 1762A with which it is associated (by virtue of a particular owner/user 1780 having secure access to both through private keys or similar security features 760, e.g.) to one or more nonvolatile media 1918. Following such backup 1946 device 700A is sent a confirmation 1948B. In some variants, moreover, the occurrence of such backups 1946 may be logged by one or more servers 600 of infrastructure 1930, such as to distinguish portions of network 550A that are adequately protected (by redundancy) versus those in which one or more additional partner blocks (e.g. containing the same primary content 1732) should be created.

In some variants the one or more servers 600 will allow a receiving block 1772C to be written only after a device 700A associated with the recipient node 1762A (e.g. user 1780) has received a request 1723 for or other advanced notification of a block write and access to at least primary content 1732 thereof. This can occur, for example, in a context in which one or more current screening criteria 1722 pertaining to node 1762A have been applied to such content or in which an actual authorization 1724 for the block write has been sent. Alternatively or additionally, in some variants one or more such criteria 1722 may be changed (e.g. made more restrictive by modifying a threshold 692) by the one or more servers 600 as an automatic and conditional response to a device 700A that controls the receiving node 1762A having transmitted a restriction or rejection of content from that particular sending node on a prior occasion.

FIG. 20 depicts the system 1700 of FIG. 17 in which a user 2080 of client device 700B provides an authorization for a more-complete state of node 1761A to be backed up. Taking into account a location 1768A of device 700B, the one or more servers 600 of infrastructure 1930 select one or more particular storage media 1918 in network 550C as a destination of the backup 1946. In general systems 1700 like The Weave™ will allow linked nodes 1762A, 1763A, 1764A (containing partner blocks) to be backed up by their respective owners to other locations. This can occur, for example, in a context in which client device 700B receives or transmits one or more instances of captures 2021 (e.g. of photographic, auditory, or other sensor data) or other portions 2022 (e.g. user-provided text) of user data, of private keys 2023 or other security data, of remainders 2024 of a block or other given set of content, or a combination thereof.

Figure 21:
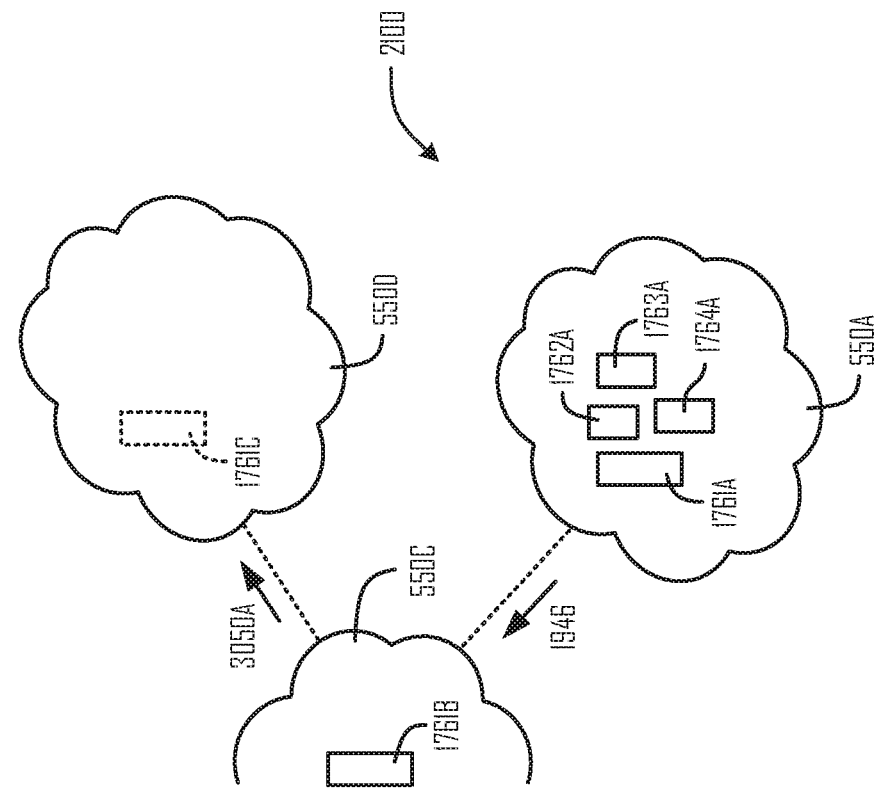
FIG. 21 depicts a more encompassing system as a preview of FIG. 24.

FIG. 21 depicts a broader system 2100 in which a clone node 1761B backed up onto network 550C has thereafter been downloaded to create another clone node 1761C in network 550D. This can occur, for example, in a context in which user 2080 satisfies one or more membership requirements or other user validation criteria of network 550D. In some variants, for example, such criteria may include a private key 2023 that is never provided to network 550A. This allows user 2080 the autonomy to migrate from a network 550A which has become untrusted or otherwise unfavorable to a new network 550D without losing any of node 1761 (a medical record history, manufacturing history, sales history, device use history, social media history or other ledger of interactions with other entities, e.g.). Such "whole cloth" node migration can include node backup 1946 or node transfer 3156A (or both), as further described below with reference to FIG. 31.

Figure 22:
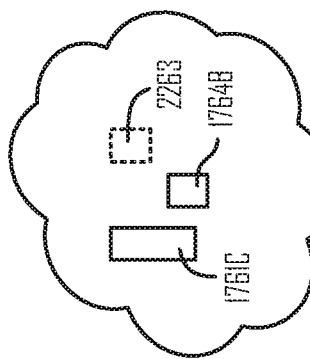
FIG. 22 depicts a more advanced state of the content of FIG. 21 as a preview of FIG. 25.

FIG. 22 depicts a later state of system 2100 in which an owner of node 1764A has been acknowledged but in which no backup or other migration of node 1764A has yet occurred. In such instances a partner block regeneration protocol allows some primary content 1732 from node 1761C to be used in reconstituting its linkage and partner block in node 1764B. FIG. 25 shows this in more detail and also depicts a node 2263 that is not yet directly related to nodes 1761C and 1764B.

Figure 23:
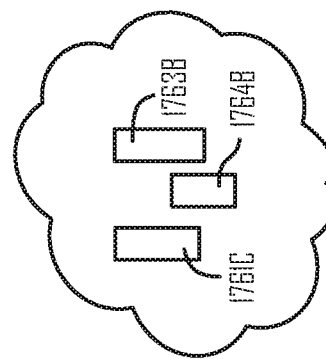
FIG. 23 depicts a more advanced state of the content of FIG. 22 as a preview of FIG. 29.

FIG. 23 depicts a much later state of system 2100, having progressed through stages successively depicted in FIGS. 24-29. In this version of systems 2100, what was node 2263 has now become part of a somewhat expanded (but still complete) version of node 1763A and is now designated as node 1763B accordingly.

FIG. 24 depicts another view of an early state of network 550D in which hybrid blocks 1771A-C of the recently migrated node 1761C have open linkages 2465 (i.e. with one or more partner blocks not found in the network 500D) and one or more of the other hybrid blocks 1771D of the reconstituted node 1761C have one or more closed linkages 1865 (e.g. with no unfound partner blocks). Shortly after the migration of node 1761, FIG. 24 shows a state like that of FIG. 21 but with additional detail. Blocks 1771E-G all have open links 2465 (shown with arrows) because each identifies one or more partner blocks that existed in network 550A but have not yet been reconstituted/found in network 550D. Two of the blocks 1771E, 1771G are each shown with an element 1719 shaded to help the reader grasp significant developments.

FIG. 25 depicts another view of an early state of network 550D, shortly after that of FIG. 24 but with two additional nodes 1764B, 2263 and one additional closed linkage 1865. This can occur, for example, in a context in which the partner block 2574A of block 1771G (both shown with a matched pattern for emphasis) was not formed by downloading any elements 1719 of node 1764A but was instead formed by cloning at least one element 1719 of block 1771G, in which network 550A has been destroyed or is now denying access to the owner of nodes 1764A-B, and in which that owner could not otherwise have recovered any of the primary content 1732 of block 2574A. Block 2574B is thereafter appended to node 1764B natively, in the normal course of everyday use. Likewise blocks 2573A-B are written to node 2263 natively, in the normal course of everyday use of network 550D in association with other nodes (not shown).

Figure 26:
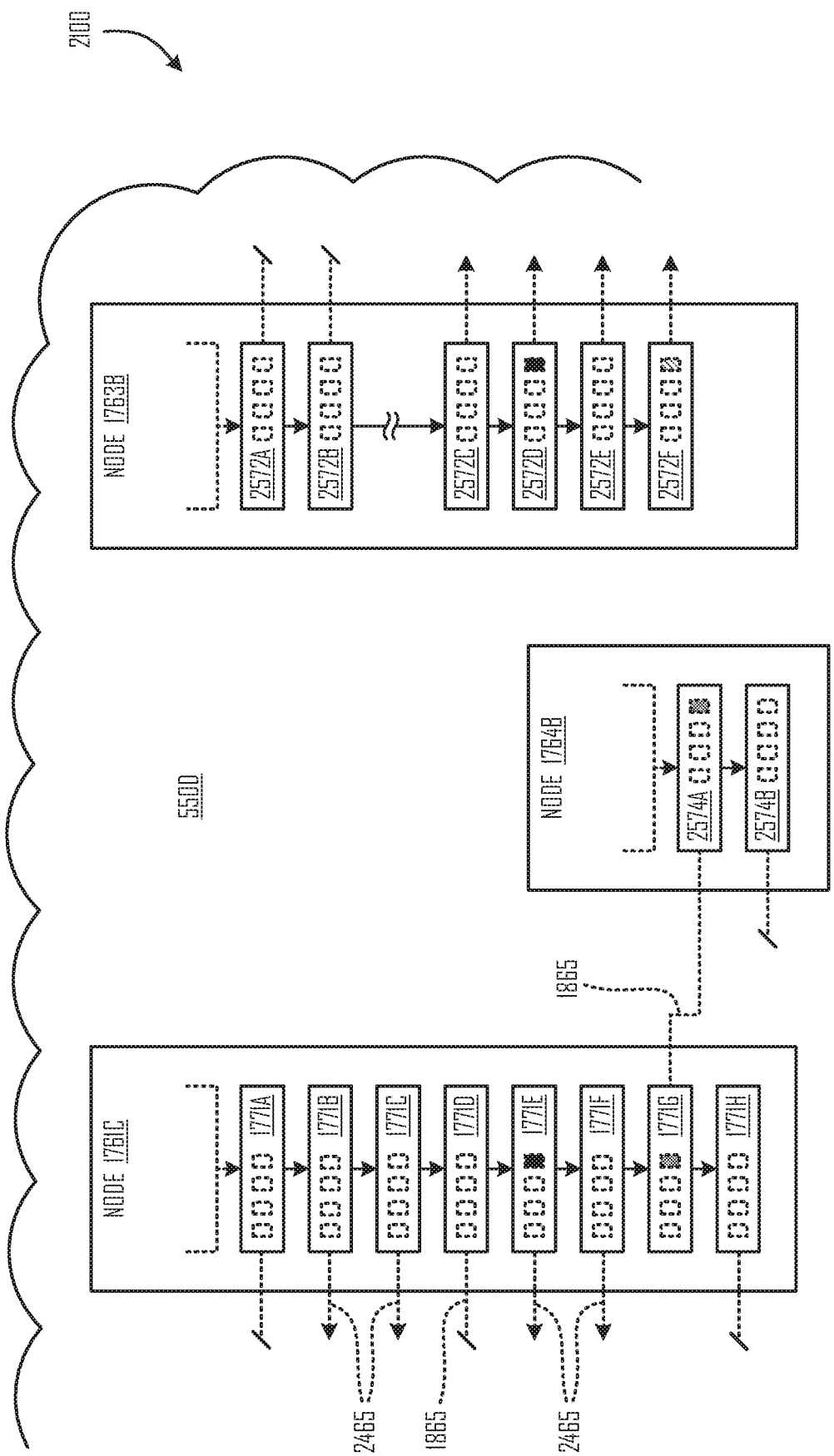
FIG. 26 depicts a more advanced state of the content of FIG. 25 featuring an undiscovered partner block and in which one or more improved technologies may be incorporated.

FIG. 26 depicts an undiscovered partner block 2572D (being a partner of block 1771E) arriving in network 550D by block migration. Counterparts of all of the blocks of node 1763A (including labeled blocks 2572C-F) are appended after the natively-grown blocks 2572A-B. Even though primary content of block 1771E (shown in black for clarity) matches that of transplanted block 2572D, network 550D has not yet identified any linkage between these two blocks.

Figure 27:
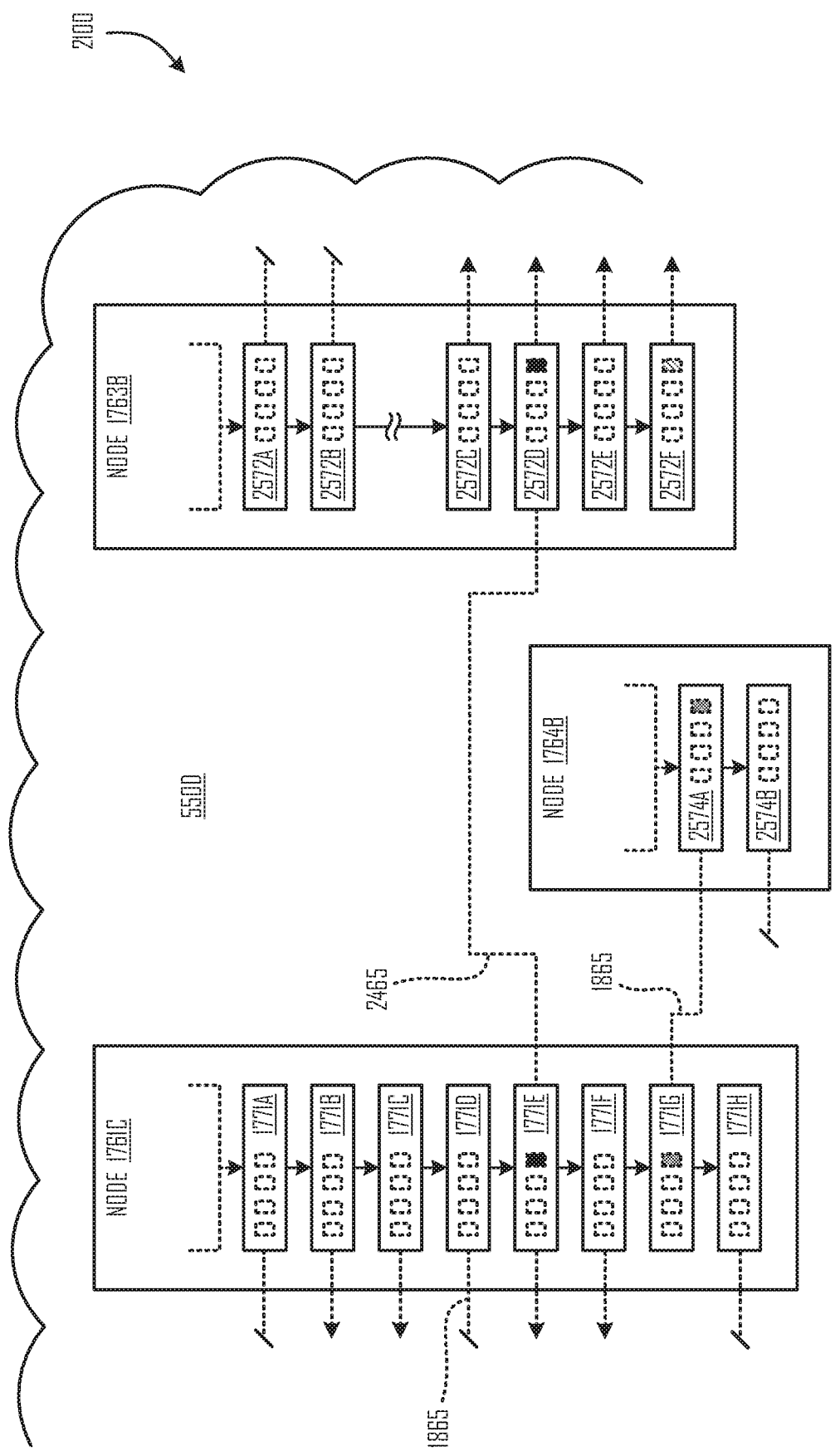
FIG. 27 depicts a more advanced state of the content of FIG. 26 in which a "partner block recovery" has occurred and in which one or more improved technologies may be incorporated.

FIG. 27 shows system 2100 in a state like that of FIG. 26 except that block 2572D is now recognized as a partner of block 1771E. The linkage 2465 between them is not yet closed, however, because both of these blocks 1771E, 2572D still identify at least one partner block 1772B that existed in network 550A but has not yet been reconstituted/found in network 550D.

Figure 28:
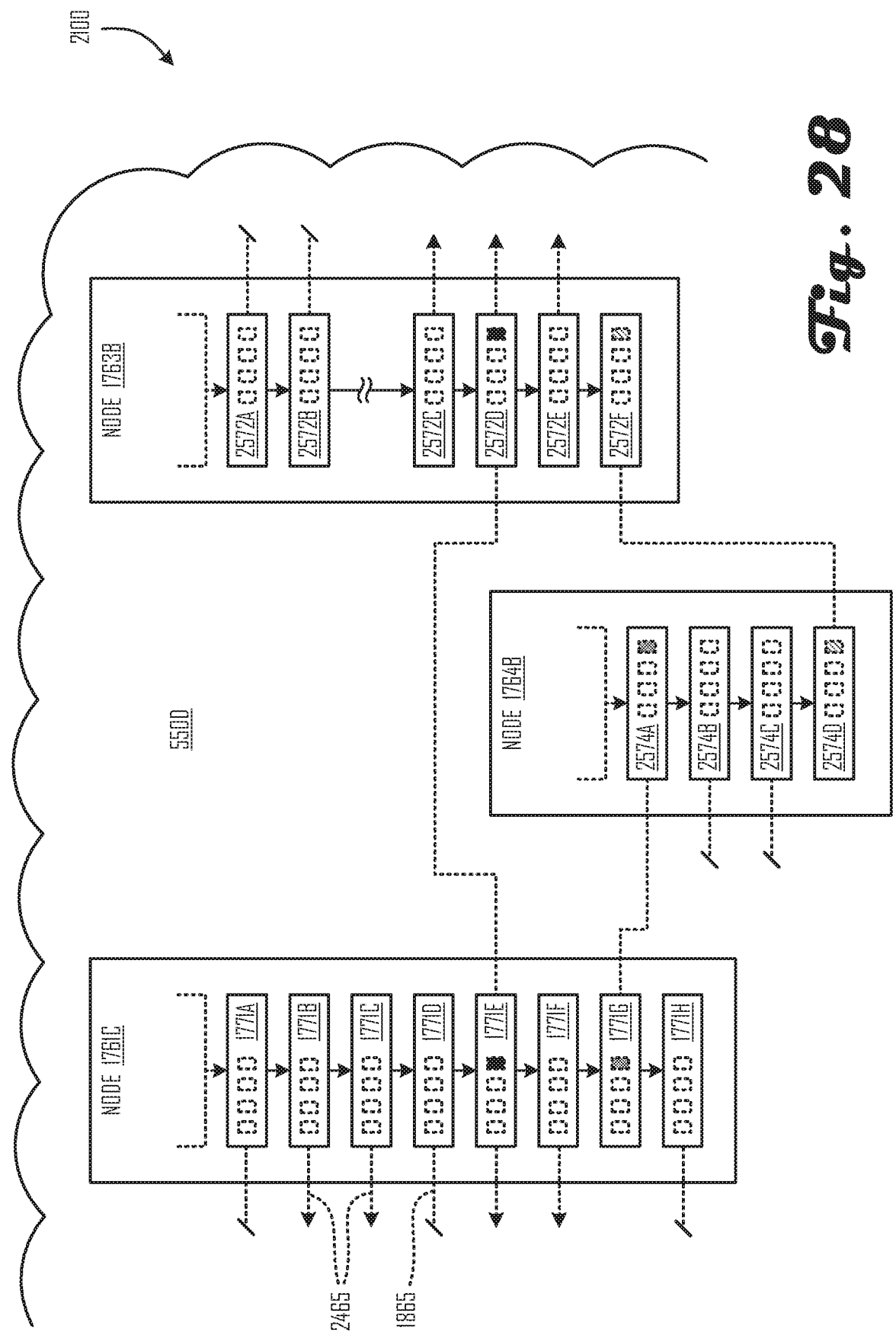
FIG. 28 depicts a more advanced state of the content of FIG. 27 in which native node growth and an additional partner block regeneration have both occurred and in which one or more improved technologies may be incorporated.

FIG. 28 shows system 2100 in a state like that of FIG. 27 except that two additional blocks 2574C-D have been added to node 1764B. Appended block 2574C was grown natively through an interaction with one or more other nodes of network 550D that are known but not shown. Later-appended block 2574D was not grown natively but was obtained by partner block regeneration, having at least some primary content 1732 that was not transferred directly from outside network 550D but came as a result of one or more modules of special-purpose circuitry 622 recognizing kinship between block 2572F and node 1764B and deriving the absent partner block (i.e. block 1774B of node 1764A) from source block 2572F as regenerated block 2574D.

Figure 29:
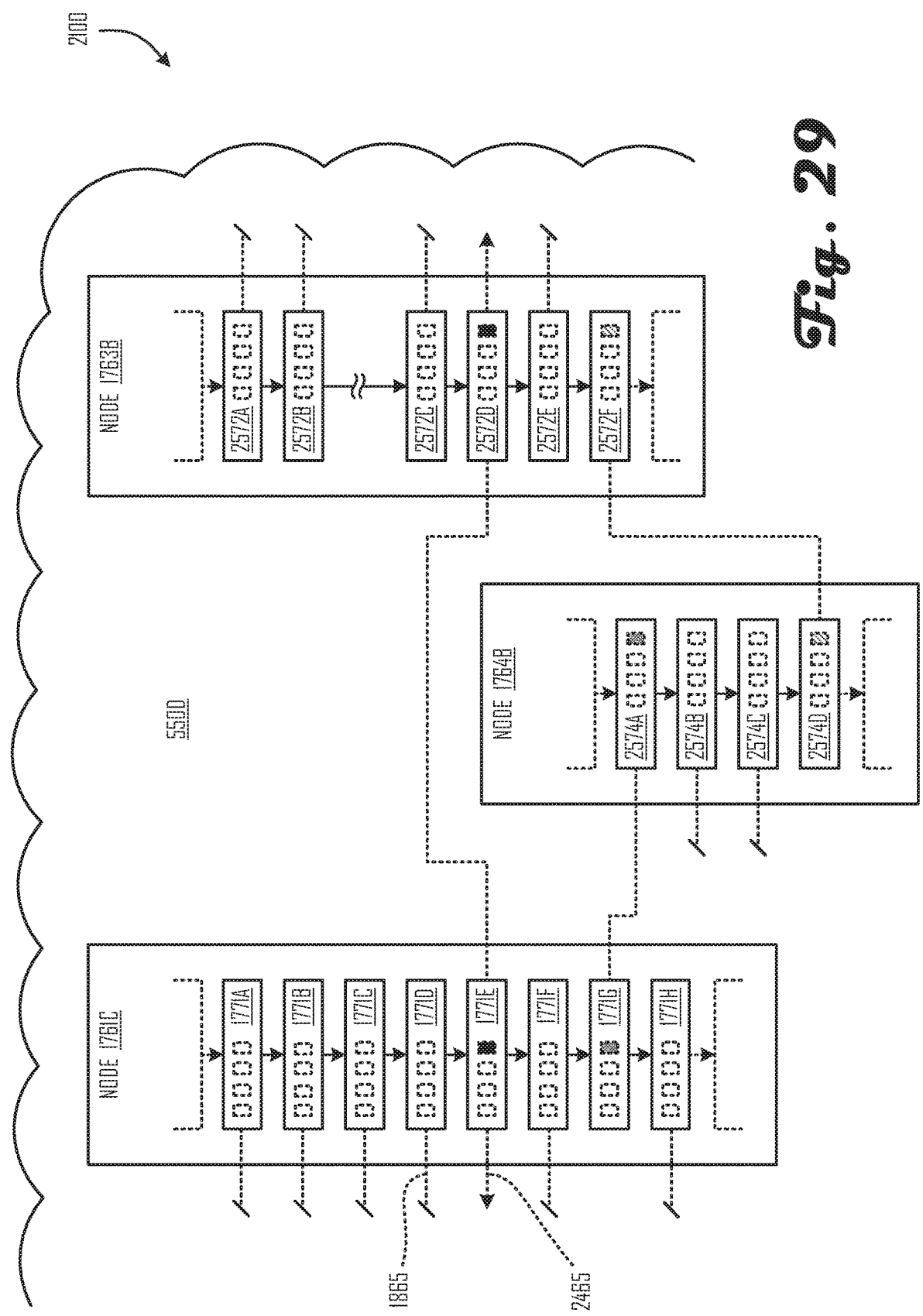
FIG. 29 depicts a more advanced state of the content of FIG. 28 in which additional native node growth and a more substantial reconstitution have both occurred and in which one or more improved technologies may be incorporated.

FIG. 29 shows system 2100 in a state like that of FIG. 28 except that a large majority of the open linkages 2465 have been changed to closed linkages 1865 using a combination of the protocols described herein over the course of days and weeks.

Figure 30:
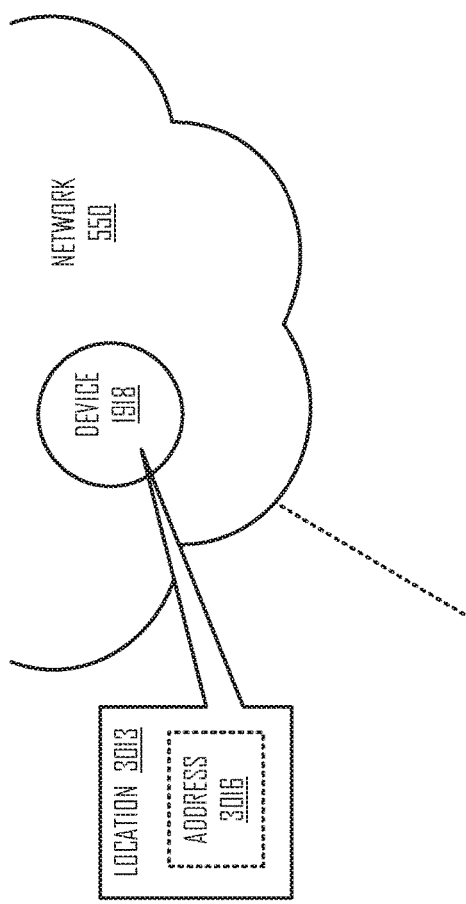
FIG. 30 depicts a variant system in which one or more improved technologies may be incorporated.

FIG. 30 depicts (an instance of) a system 1600, 1700, 3000 in which one or more improved technologies may be incorporated. As shown a distributed or other infrastructure 1930, 3030 may implement one or more instances of input modules 3031, of recordation modules 3032, of secondary modules 3033, of migration modules 3034, of preparatory or other support modules 3035, of recordations 3094A-B or other responses 3090, of transmitters 3096, of receivers 3097, of correspondences 3098A-B as further described below. In some variants a combination of these in communication with one or more of the above-described networks 550 may implement various improved protocols for migration as described herein.

In some variants such an input module 3031 as shown may comprise transistor-based circuitry configured to obtain user content from a first human user who is or was using a first computing device (e.g. by one or more input modules 3031 obtaining via a computing device 700 first user content 1721 that originated from a first human user 1780 as shown in FIG. 17). This can occur, for example, in a context in which components of such content are each manifested as a voltage configuration 3051 on an electrical node set 3041 of such an input module 3031. Alternatively or additionally, an app 724 residing on that device 700 may have elicited an authorization to retrieve such content 1721 (e.g. from a memory 704 or medium 718 thereof) in a structured dialog, not shown.

Likewise a recordation module 3032 as shown may comprise transistor-based circuitry configured to record a first rendering of the user content onto a first blockchain node and a second rendering of the user content onto a second blockchain node (e.g. by one or more recordation modules 3032 recording a first rendering 1735A of the user content 1721 onto a first blockchain node 1761 and a second rendering 1735B of the first user content 1721 onto a second blockchain node 1762). This can occur, for example, in a context in which a first cryptographic hash 1734A at least partly protects the first rendering 1735A (e.g. against surreptitious tampering), in which a second cryptographic hash 1734B protects the second rendering 1735B, in which the first and second cryptographic hashes 1734A-B are not identical (e.g. by virtue of respective nodes 1761-1763 each performing its own hashing operation), and in which the cryptographic hashes 1734 are each manifested as a respective voltage configuration 3052 on an electrical node set 3042 of respective (instances of) recordation modules 3032. In some variants, for example, each such rendering 1735 of the first user content 1721 may be obtained by (1) generating the first rendering 1735A by extracting secondary data from a raw version of the user content for recordation in archival storage media (e.g. on device 1918) and by including a reference to at least some of the secondary data with a remainder 2024 of the user content 1721 in the first rendering 1735A of the first user content 1721 and (2) after extracting the secondary data from the raw version of the first user content, generating the second rendering 1735B by including at least a reference to the secondary data with the remainder 2024 of the first user content 1721 in the second rendering 1735B of the first user content 1721.

Likewise a secondary module 3033 as shown may comprise transistor-based circuitry configured to trigger a recordation of secondary content of the user content onto one or more storage media (e.g. by one or more secondary modules 3033 triggering a recordation 3094B of secondary content 1785 onto one or more storage media 718, 1718 as an automatic and conditional response 3090 partly based on a physical location 1768A of the computing device 700 (e.g. one or more elevations or other coordinates 1243 thereof) and partly based on the renderings 1735A-B each including at least one pointer 1731A-B directly or otherwise indicating (at least) a first storage location 3013 (e.g. an address 3016 on or other reference to one or more storage media 718, 1718) of the secondary content 1785). This can occur, for example, in a context in which the secondary content 1785 resides or will reside at such locations 3013, in which the secondary storage management is performed as an automatic and conditional response to a size of the secondary data or to a format or other type of the secondary data (or both), in which one or more addresses 3013 of the secondary data storage are manifested as a voltage configuration 3053 on an electrical node set 3043 of respective (instances of) secondary modules 3033, and in which a system 1700 containing these nodes 1761-1763 could not otherwise deter malware attacks by harnessing the interests of content owners who regularly back up rapidly growing content. Even a few such owners could ensure the survival of the worthiest attack targets even with social media content, medical or enterprise records, or similarly rapid node content growth (e.g. faster than 10% per year).

Likewise a migration module 3034 as shown may comprise transistor-based circuitry configured to implement a programmatic migration from the first rendering to at least one other rendering owned by one or more other human users (e.g. by one or more migration modules 3034 triggering, configuring, or otherwise causing a programmatic migration 3100 from the first rendering 1735A at least to one or more other renderings 1735C as a recovery or reconstitution on the second or other blockchain nodes 1762-1763). This can occur, for example, in a context in which the second rendering 1735B is destroyed before the one or more migration modules 3034 are invoked and in which device-executable code or operating parameters are manifested as a voltage configuration 3054 on an electrical node set 3044 of respective (instances of) migration modules 3034.

Alternatively or additionally a preparatory or other support module 3035 as shown may be configured to perform other functions described herein with reference to any of FIGS. 17-30. This can occur, for example, in a context in which invocation parameters for conventional backup and migration protocols are manifested as a voltage configuration 3055 on an electrical node set 3045 of respective (instances of) support modules 3035. See FIG. 31.

Figure 31:
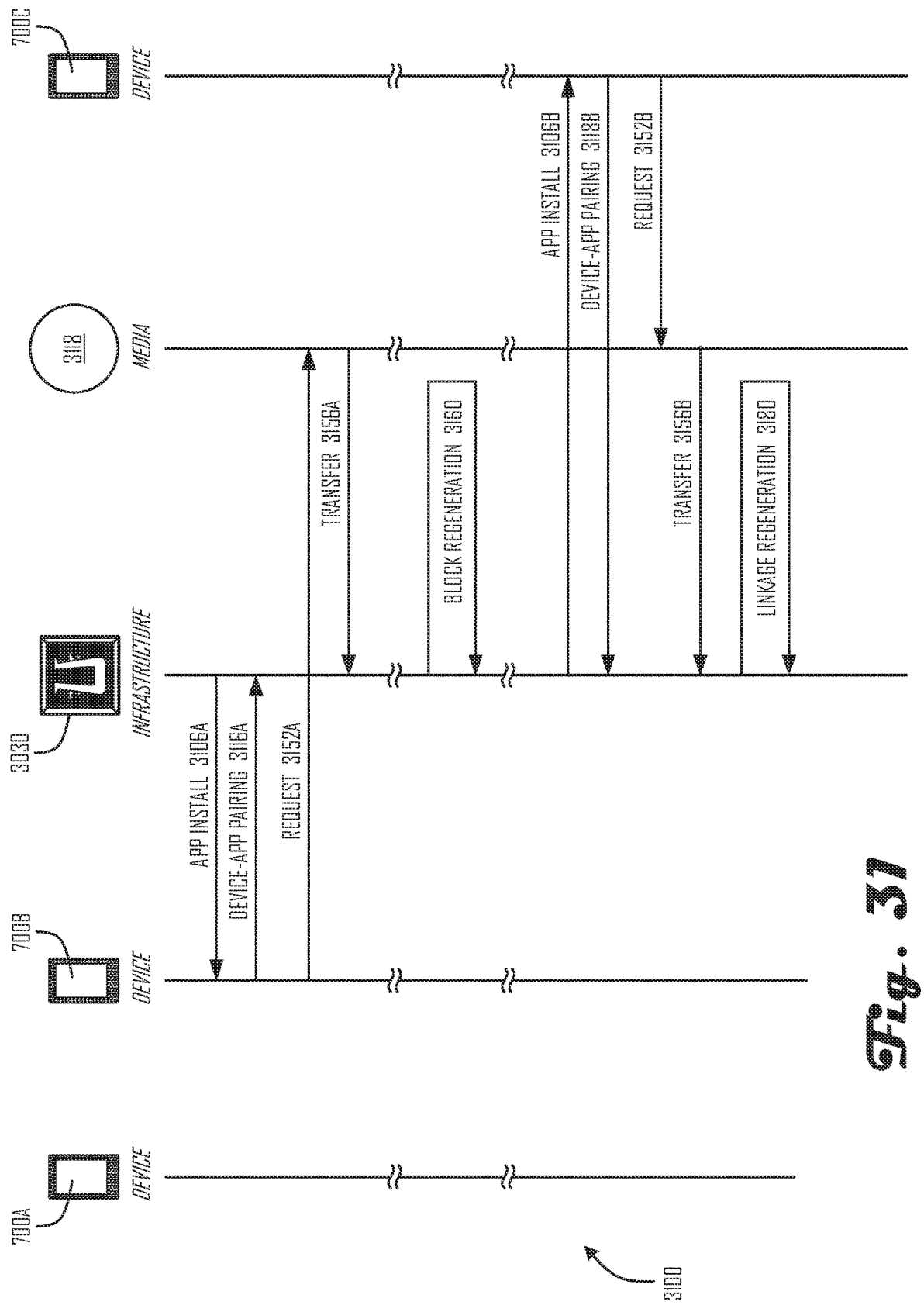
FIG. 31 depicts a particular scenario and progressive data flow in which one or more client devices and servers interact for a migration in which one or more improved technologies may be incorporated.

FIG. 31 illustrates a data flow of a migration 3100 with an exemplary series of events (communications or other processes, e.g.) suitable for use with at least one embodiment. In some variants of the above-described methods, for example, an app install 3106A is downloaded from a new application platform or other infrastructure 3130 and optionally implemented so as to create a unique device-app pairing 3116A identified within the infrastructure 3130 (in association with another user profile 1275, e.g.). Device 1700B then transmits a request 3152A that triggers a transfer 3156A of clone node 1761B from network 550C to become another clone node 1761C in network 550D as shown in FIG. 21. Later one or more block regenerations 3160 occur, such as that described above with reference to regenerating block 2574A from primary content 1732 or other key elements 1719 (or both) of block 1771G in FIG. 25.

Some time later an app install 3106B is downloaded from infrastructure 3130 and implemented so as to create a unique device-app pairing 3116B identified (by a model and serial number of device 700C with a unique identifier of the app/version, e.g.) within the infrastructure 3130. This allows device 700C, operated by user 580, to transmit a request 3152B that triggers a transfer 3156B (e.g. directly from infrastructure 1930 or indirectly through one or more media 1918, 3118) to spawn another clone node 1763B in network 550D as shown in FIG. 26. In this case, however, the spawning involves appending all of the parent node blocks 1773A-D to correspond with blocks 2572C-F as shown rather than writing the node anew. Thereafter one or more linkage regenerations 3180 occur, such as a linkage 2465 connecting block 1771E with its partner block 2572D. Although this linkage is permissible because of the identical or other matching primary content 1732, these two blocks share, linkage 2465 is still marked as an open linkage (with arrows) because both of these blocks 1771E, 2572D still identify at least one partner block 1772B that existed in network 550A but has not yet been reconstituted/found in network 550D. This remains true even after all of the other linkages in network 550D as shown become closed, as depicted in FIG. 29.

In some variants of the above-described system 1700, a list of renderings on node 1761A that are of a particular category id, or similar or related category id, may be created and extended as additional renderings are created with the same or related category ids (i.e., a digest of same or similar renderings on a given node). Such renderings may not be sequential, and may have many renderings placed on the blockchain of different categories between entries in the digest (i.e., a digest of a category id that corresponds to hospital visits may include rendering 100, rendering 127, and rendering 218 for said node 1761A in system 1700). Said list of renderings may contain additional information about each rendering in the list (e.g., time, location, other participating nodes and their unique identifier, events, and so on) that may in some variants be filtered or constrained to allow subsets of said list to be created, for purposes of selective sharing of renderings, including time-bound shared access to filtered lists that may expire of otherwise limit access to renderings in said filtered list. Said list of renderings based on category metadata may make searching and traversal of renderings, or groups of renderings, more efficient or effective in some variants of the above-described system 1700, or other such systems. In some variants, a rendering may include metadata that identifies the most recent prior rendering, if any, that contains the same category id as said current rendering's category id (referred to as a "wormhole" herein and depicted in FIG. 39).

In some variants of the above-described system 1700, a given node 1761A may experience requests or requirements where two or more renderings must be created in a very short timeframe, straining the ability of system 1700 to create all requested renderings in serial sequence, or requiring two or more renderings to be created simultaneously (i.e., a burst of activity or block requests). In such situations, node 1761A may create a sideline of node 1761A (or multiple sidelines in some variants, based on rendering creation demand), where two or more renderings share the same immediately previous rendering on said node 1761A. Such a sideline (see FIGS. 41-42) creates as many subsequent renderings as necessary to facilitate the burst in activity (i.e., a sideline creates renderings in parallel with node 1761A, for the duration of the burst of activity), until the sideline is merged into node 1761A by creation of a rendering placed on node 1761A with metadata that identifies the merging of one or more sidelines. In some variants, a sideline merges with the main blockchain as soon as the burst of activity subsides.

Those skilled in the art will recognize that networks 550 that allow for such reconstitution protocols with appropriate Upheaval™ or similar shared-block infrastructures 830, 1930, 3130 as described herein are far less attractive for data corruption attacks. Moreover these infrastructures can significantly help with load balancing or other aspects of incremental migration 3100 in contexts where numerous blockchains or similar amorphous nodes interact.

All of the patents and other publications referred to above are incorporated herein by reference generally—including those identified in relation to particular new applications of existing techniques—to the extent not inconsistent herewith. While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (e.g. with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

1. A content reconstitution preparedness method comprising:
 invoking transistor-based circuitry (e.g. invoking or including one or more input modules 3031) configured to obtain first user content 1721 from a first human entity via a first computing device 700 (e.g. that was then in use by the human user 1780 or pertained to a human subject);
 invoking transistor-based circuitry (e.g. invoking or including one or more recordation modules 3032) configured to record a first rendering 1735A of the first user content 1721 onto a first node 1761 and a second rendering 1735B of the first user content 1721 onto a second node 1762, wherein a first cryptographic hash 1734A (at least partly) protects the first rendering 1735A, wherein a second cryptographic hash 1734B protects the second rendering 1735B, wherein the first rendering 1735A is encrypted or not encrypted or partly encrypted, and wherein the second rendering 1735B is encrypted or not encrypted or partly encrypted; and
 invoking transistor-based circuitry (e.g. invoking or including one or more secondary modules 3033) configured to trigger a recordation 3094B of secondary content 1785 of the first user content 1721 onto one or more storage media 718, 1718 as an automatic and conditional response 3090 partly based on (one or more coordinates 1243 or addresses 3016 of) a physical, logical, or other location 1768A of the first computing device 700A (e.g. one or more elevations or other coordinates 1243) and partly based on the first and second renderings 1735A-B (being distilled into or otherwise) both comprising at least one pointer 1731A-B indicating (directly or otherwise at least) a first storage location 3013 (e.g. an address 3016 on one or more storage media 718, 1718) of the secondary content 1785 (e.g. directly or otherwise identifying one or more addresses on one or more archival media 718, 1718 where the secondary content 1785 resides or will reside).

2. The method of ANY one of the above method clauses, wherein the first cryptographic hash 1734A protects a first part of the first rendering 1735A, wherein another cryptographic hash 1734 protects another part of the first rendering 1735A, wherein the second cryptographic hash 1734B protects a first part of the second rendering 1735B, and wherein yet another cryptographic hash 1734 protects another part of the second rendering 1735B.

3. The method of ANY one of the above method clauses, comprising:
 implementing a programmatic migration 3100 from the first rendering 1735A to a third rendering 1735C.

4. The method of ANY one of the above method clauses, wherein the first rendering 1735A is encrypted or partly encrypted and wherein the second rendering 1735B is encrypted or partly encrypted; and 5. The method of ANY one of the above method clauses, wherein implementing a programmatic migration 3100 from the first rendering 1735A to a third rendering 1735C comprises:
 implementing both native node growth (e.g. as shown in FIGS. 28-29) and a partner block regeneration protocol upon a third node 1764A (e.g. as a backup or other migration protocol destination).

6. The method of ANY one of the above method clauses, wherein implementing a programmatic migration 3100 from the first rendering 1735A to a third rendering 1735C comprises:
 implementing a partner block regeneration protocol upon a third node 1764A.

7. The method of ANY one of the above method clauses, wherein implementing a programmatic migration 3100 from the first rendering 1735A to a third rendering 1735C comprises:
 implementing a partner block regeneration protocol upon a third node 1764A partly based on a particular component (e.g. block 2572F) of the first rendering 1735A relating to the third node 1764A and partly based on a determination that the third node 1764A has no counterpart component corresponding to the particular component.

8. The method of ANY one of the above method clauses, wherein implementing a programmatic migration 3100 from the first rendering 1735A to a third rendering 1735C comprises:
 implementing a partner block regeneration protocol upon a third node 1764A partly based on a particular component (e.g. block 2572F) of the first rendering 1735A relating to the third node 1764A and partly based on a determination that the third node 1764A has no counterpart component corresponding to the particular component, wherein implementing the partner block regeneration protocol comprises (at least) reconstituting the particular component by generating a counterpart component (e.g. a rendering of the particular component) on the third node 1764A.

9. The method of ANY one of the above method clauses, comprising
 configuring more than 40% of the first node as blocks that commemorate an event.

10. The method of ANY one of the above method clauses, comprising configuring more than 40% of the first node as blocks that commemorate a human entity (e.g. a single human user or corporation).

11. The method of ANY one of the above method clauses, comprising
configuring more than 40% of the first node as blocks that commemorate a facility.

12. The method of ANY one of the above method clauses, comprising
configuring more than 40% of the first node as blocks that each contain or otherwise indicate a respective timestamp.

13. The method of ANY one of the above method clauses, comprising
configuring more than 40% of the first node as blocks that each contain or otherwise indicate a corresponding physical location 1768.

14. The method of ANY one of the above method clauses, comprising
configuring more than 40% of the first node as blocks that all pertain to a particular (therapeutic or other) regimen.

15. The method of ANY one of the above method clauses, comprising
configuring more than 40% of the first node as blocks that all pertain to a particular service.

16. The method of ANY one of the above method clauses, comprising
configuring more than 40% of the first node as blocks that all pertain to a particular product.

17. The method of ANY one of the above method clauses, comprising:
invoking transistor-based circuitry (e.g. invoking or including one or more migration modules 3034) configured to implement a programmatic migration 3100 from the first rendering 1735A at least to one or more other renderings 1735C of the first user content 1721 owned by one or more other human users 2080 after a catastrophic loss of at least the second rendering 1735B.

18. The method of ANY one of the above method clauses, comprising:
invoking transistor-based circuitry (e.g. invoking or including one or more migration modules 3034) configured to implement a programmatic migration 3100 from the first rendering 1735A at least to one or more other renderings 1735C of the first user content 1721 (e.g. as a recovery or reconstitution on the second or other nodes 1762-1763) as an automatic and conditional response 3090 to a catastrophic loss of at least the second rendering 1735B.

19. The method of ANY one of the above method clauses, comprising:
implementing a programmatic migration 3100 from the first rendering 1735A so as to provide the first user content 1721 in two or more respective non-identical renderings 1735A-C owned by respective users so as to manifest a preparedness for a future (recovery, reconstitution, or other) migration 3100 of such nodes (e.g. as a component of a programmatic migration 3100 or strategic response to a catastrophic failure).

20. The method of ANY one of the above method clauses, comprising:
implementing a programmatic migration 3100 by providing the first user content 1721 in two or more respective non-identical renderings 1735A-C owned by different users so as to manifest a preparedness for a future (recovery, reconstitution, or other) migration 3100 of such nodes (e.g. as a component of a programmatic migration 3100 or strategic response to a catastrophic failure).

21. The method of ANY one of the above method clauses, comprising:
invoking transistor-based circuitry configured to select specific archival media 718, 1718 near the physical location 1768A (within a county, radius, or other definable vicinity 1769 of that location) at which the requesting device 700A was present when a (camera 124 or other) sensor 132 of the requesting device 700A captured a component (e.g. audio or image data 1783) of the first user content 1721.

22. The method of ANY one of the above method clauses, comprising:
invoking transistor-based circuitry configured to select specific archival media 718, 1718 near the physical location 1768A at which the requesting device 700A was present when a (wireless receiver 3097 or other) user input 708 of the requesting device 700A downloaded a component (e.g. an app 724 or other device-executable code 1784) of the first user content 1721.

23. The method of ANY one of the above method clauses, wherein
invoking transistor-based circuitry configured to select specific archival media 718, 1718 near the physical location 1768A at which the requesting device 700A was present when a (wireless transmitter 3096 or other) network interface 706 of the requesting device 700A uploaded a component (e.g. image data 1783 or device-executable code 1784) of the first user content 1721.

24. The method of ANY one of the above method clauses, wherein the first and second cryptographic hashes 1734A-B are not identical.

25. The method of ANY one of the above method clauses, wherein at least a corresponding portion 2022 of the first and second renderings 1735A-B comprise respective instances of the same media content in the same format.

26. The method of ANY one of the above method clauses, wherein at least a corresponding portion 2022 of the first and second renderings 1735A-B comprise respective instances of the same media content parsed identically.

27. The method of ANY one of the above method clauses, wherein at least a corresponding portion 2022 of the first and second renderings 1735A-B comprise respective instances of the same media content compressed identically.

28. The method of ANY one of the above method clauses, wherein the first and second renderings 1735A-B are identical.

29. The method of ANY one of the above method clauses, wherein the first user content 1721 includes one or more draft posts 1645 (e.g. as a portion 2022 thereof).

30. The method of ANY one of the above method clauses, wherein the first user content 1721 includes one or more complete posts 1647.

31. The method of ANY one of the above method clauses, wherein the first and second renderings 1735A-B both contain a particular social media post in common.

32. The method of ANY one of the above method clauses, wherein the first and second renderings 1735A-B both contain a particular medical or other healthcare record in common.

33. The method of ANY one of the above method clauses, wherein the first and second renderings 1735A-B both contain a particular enterprise record in common.

34. The method of ANY one of the above method clauses, wherein the referenced content 1785 includes at least one of photographic image data (e.g. image data 1783) or device-executable code 1784.

35. The method of ANY one of the above method clauses, wherein the first user content 1721 includes event data 1222.

36. The method of ANY one of the above method clauses, wherein the first user content 1721 includes user text 1224 (e.g. a smart contract).

37. The method of ANY one of the above method clauses, wherein the first user content 1721 includes a smart contract.

38. The method of ANY one of the above method clauses, wherein the first user content 1721 includes observational data 1240.

39. The method of ANY one of the above method clauses, wherein the first user content 1721 includes observational data 1240 comprising a video clip 1242.

40. The method of ANY one of the above method clauses, wherein the first user content 1721 includes event-descriptive or location-descriptive data 1222.

41. The method of ANY one of the above method clauses, wherein the first user content 1721 includes event-descriptive or location-descriptive data 1222, comprising a post 1220.

42. The method of ANY one of the above method clauses, wherein the first user content 1721 includes event data 1222.

43. The method of ANY one of the above method clauses, wherein node identification metadata in said first and second renderings 1735A-B uniquely commemorates blockchain-entity pairing.

44. The method of ANY one of the above method clauses, wherein node identification metadata in said first and second renderings 1735A-B uniquely commemorates blockchain ownership.

45. The method of ANY one of the above method clauses, wherein node identification metadata in said first and second renderings 1735A-B at least partly identifies each rendering on each blockchain node.

46. The method of ANY one of the above method clauses, wherein node identification metadata in said first and second renderings 1735A-B at least partly identifies each rendering on each blockchain node.

47. The method of ANY one of the above method clauses, wherein block sequence metadata in said first and second renderings 1735A-B at least partly identifies each rendering on each blockchain node.

48. The method of ANY one of the above method clauses, wherein node identification metadata and block sequence metadata in said first and second renderings 1735A-B jointly identify each rendering on each blockchain node uniquely.

49. The method of ANY one of the above method clauses, wherein said first and second renderings 1735A-B each include data category metadata that describes a portion of or an entirety of at least said respective rendering.

50. The method of ANY one of the above method clauses, wherein said first rendering 1735A includes industry-identifying metadata describing a portion of or an entirety of said first rendering.

51. The method of ANY one of the above method clauses, wherein said first rendering 1735A includes an industry-defined data category describing a portion of or an entirety of said first rendering.

52. The method of ANY one of the above method clauses, wherein said first rendering 1735A includes activity code metadata describing a portion of or an entirety of said first rendering.

53. The method of ANY one of the above method clauses, wherein said first rendering 1735A includes industry-identifying metadata and activity code metadata describing a portion of or an entirety of said first rendering.

54. The method of ANY one of the above method clauses, wherein said first rendering 1735A includes industry-identifying metadata and activity code metadata describing a portion of or an entirety of said first rendering.

55. The method of ANY one of the above method clauses, wherein said first and second rendering 1735A-B each contain metadata that includes a reference to the most recent previous rendering on a current node of a same or similar category identifier.

56. The method of ANY one of the above method clauses, comprising:
allowing a first user access to said first rendering 1735A in response to an access authorization from a second user, wherein said second user owns said first rendering 1735A.

57. The method of ANY one of the above method clauses, comprising:
allowing a first user access to a pointer to said first rendering 1735A in response to an access authorization from a second user, wherein said second user owns said first rendering.

58. The method of ANY one of the above method clauses, comprising:
allowing a first user temporary selective access to part of said first rendering 1735A in response to an access authorization from a second user, wherein said second user owns said first rendering.

Figure 42:
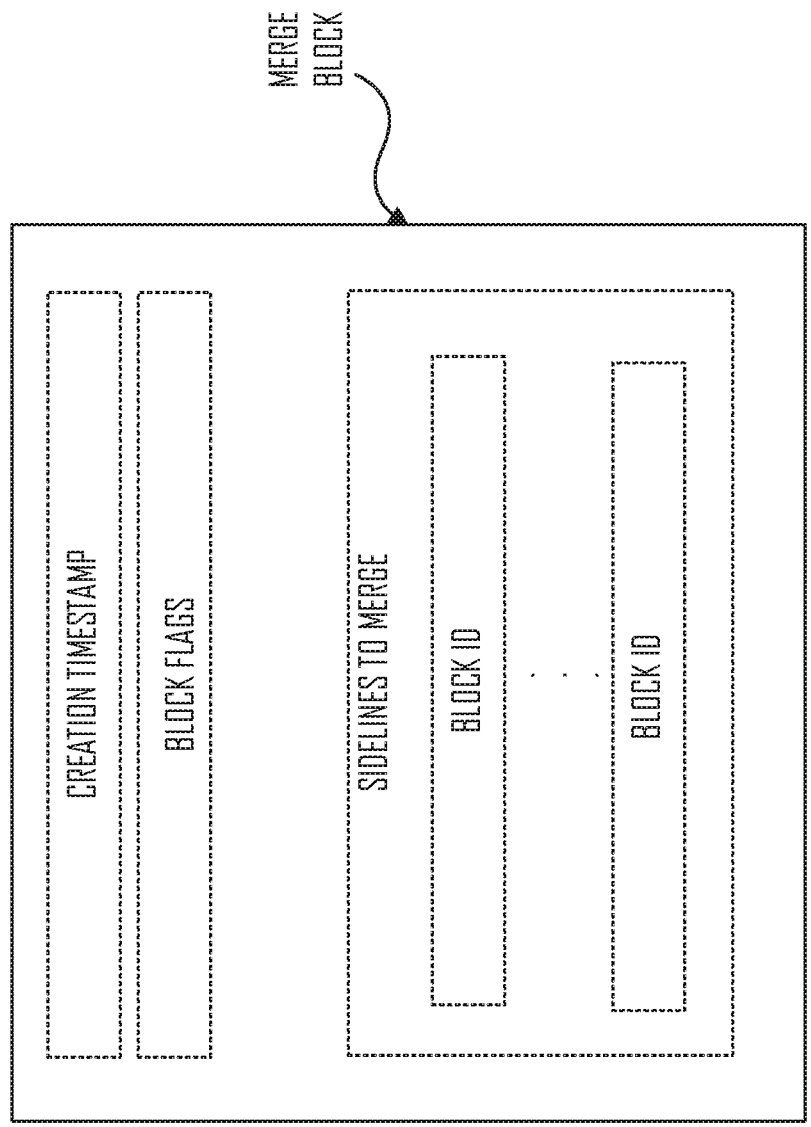
FIG. 42 depicts a merge block configured to facilitate a potential future migration as described herein in which one or more improved technologies may be incorporated.

59. The method of ANY one of the above method clauses, wherein a blockchain node creates a sideline (as depicted in FIGS. 41-42) to facilitate creation of timely renderings, wherein said sideline subsequently merges with the blockchain node that created it.

60. The method of ANY one of the above method clauses, wherein the first user content 1721 includes provenance-indicative metadata describing other parts of the user content 1721.

61. The method of ANY one of the above method clauses, wherein the first user content 1721 includes node identification metadata uniquely describing or commemorating blockchain ownership or blockchain-entity pairing.

62. The method of ANY one of the above method clauses, wherein the first user content 1721 includes category metadata (i.e., a data category identifier) describing parts of or the entirety of the user content 1721.

63. The method of ANY one of the above method clauses, wherein the first user content 1721 includes industry-identifying metadata describing parts or the entirety of the user content 1721.

64. The method of ANY one of the above method clauses, wherein the first user content 1721 includes industry-specific category or activity code metadata describing parts or the entirety of the user content 1721.

65. The method of ANY one of the above method clauses, wherein the first user content 1721 includes node identification and block sequence metadata or a combination thereof (i.e., a unique block reference identifier) that uniquely identifies user content 1721.

66. The method of ANY one of the above method clauses, wherein access to one or more renderings, whether the rendering itself or pointers to the rendering recorded onto one or more storage media 718, 1718, whether said rendering (or renderings) is encrypted, unencrypted, or otherwise secured, is temporarily or permanently granted.

67. The method of ANY one of the above method clauses, wherein a list of one or more references to renderings that consist of the same or similar category id exists.

68. The method of ANY one of the above method clauses, wherein a rendering contains metadata that includes a reference on the current node to the most recent previous rendering of the same or similar category id.

69. The method of ANY one of the above method clauses, wherein access to one or more renderings, or pointers to renderings recorded on storage media, whether such renderings are encrypted or unencrypted, is temporarily or permanently granted by said first user or said second user.

70. The method of ANY one of the above method clauses, wherein node 1761A creates a sideline thereof to facilitate creation of timely renderings, and said sideline is subsequently merged with node 1761A.

71. The method of ANY one of the above method clauses, wherein the first user content 1721 includes provenance-indicative metadata describing other parts of the user content 1721 and wherein the provenance-indicative metadata comprises a capture-indicative timestamp 1244 pertaining to other parts of the user content 1721.

72. The method of ANY one of the above method clauses, wherein the invoking the transistor-based circuitry (e.g. comprising module 3032) configured to record the first rendering 1735A of the first user content 1721 onto the first node 1761 and the second rendering 1735B of the first user content 1721 onto the second node 1762 comprises modifying the first node 1761 so that more than 99% of the first rendering 1735A is protected from tampering by a first cryptographic hash 1734A (e.g. in or near the rendering 1735A) insofar that a correspondence 3098A between the first cryptographic hash 1734A and the first rendering 1735A signals that no such tampering of the first rendering 1735A has occurred.

73. The method of ANY one of the above method clauses, wherein the invoking the transistor-based circuitry (e.g. comprising module 3032) configured to record the first rendering 1735A of the first user content 1721 onto the first node 1761 and the second rendering 1735B of the first user content 1721 onto the second node 1762 comprises modifying the first node 1761 so that more than 99% of the first rendering 1735A is protected from tampering by a first cryptographic hash 1734A (e.g. in or near the rendering 1735A) insofar that a correspondence 3098A between the first cryptographic hash 1734A and the first rendering 1735A signals that no such tampering of the first rendering 1735A has occurred; and modifying the second node 1762 so that more than 99% of the second rendering 1735B is protected from tampering by a second cryptographic hash 1734B insofar that a correspondence 3098B between the second cryptographic hash 1734B and the second rendering 1735B signals that no such tampering of the second rendering 1735B has occurred.

74. The method of ANY one of the above method clauses, wherein the invoking the transistor-based circuitry (e.g. comprising module 3032) configured to record the first rendering 1735A of the first user content 1721 onto the first node 1761 and the second rendering 1735B of the first user content 1721 onto the second node 1762 comprises modifying the first node 1761 so that more than half of the first rendering 1735A is protected from tampering by a first cryptographic hash 1734A (e.g. in or near the rendering 1735A) insofar that a correspondence 3098A between the first cryptographic hash 1734A and the first rendering 1735A signals that no such tampering of the first rendering 1735A has occurred.

75. The method of ANY one of the above method clauses, wherein the invoking the transistor-based circuitry (e.g. comprising module 3032) configured to record the first rendering 1735A of the first user content 1721 onto the first node 1761 and the second rendering 1735B of the first user content 1721 onto the second node 1762 comprises modifying the first node 1761 so that more than half of the first rendering 1735A is protected from tampering by a first cryptographic hash 1734A (e.g. in or near the rendering 1735A) insofar that a correspondence 3098A between the first cryptographic hash 1734A and the first rendering 1735A signals that no such tampering of the first rendering 1735A has occurred; and modifying the second node 1762 so that more than half of the second rendering 1735B is protected from tampering by a second cryptographic hash 1734B insofar that a correspondence 3098B between the second cryptographic hash 1734B and the second rendering 1735B signals that no such tampering of the second rendering 1735B has occurred.

76. A content reconstitution preparedness system comprising: transistor-based circuitry (e.g. invoking or including one or more input modules 3031) configured to obtain first user content 1721 (that originated) from a first human user 1780 via a first computing device 700 (e.g. that was then in use by the human user 1780);

transistor-based circuitry (e.g. invoking or including one or more recordation modules 3032) configured to record a first rendering 1735A of the first user content 1721 onto a first node 1761 and a second rendering 1735B of the first user content 1721 onto a second node 1762, wherein a first cryptographic hash 1734A (at least partly) protects the first rendering 1735A, and wherein a second cryptographic hash 1734B protects the second rendering 1735B, and transistor-based circuitry (e.g. invoking or including one or more secondary modules 3033) configured to trigger a recordation 3094B of secondary content 1785 of the first user content 1721 onto one or more storage media 718, 1718 as an automatic and conditional response 3090 partly based on (one or more coordinates 1243 of) a physical location 1768A of the first computing device 700A (e.g. one or more elevations or other coordinates 1243) and partly based on the first and second renderings 1735A-B (being distilled into or otherwise) both comprising at least one pointer 1731A-B indicating (directly or otherwise at least) a first storage location 3013 (e.g. an address 3016 on one or more storage media 718, 1718) of the secondary content 1785 (e.g. directly or otherwise identifying one or more addresses on one or more archival media 718, 1718 where the secondary content 1785 resides or will reside).

77. The system of Clause 76, wherein (in respective variants) the system is configured to perform ANY one of the above method clauses.

Figure 32:
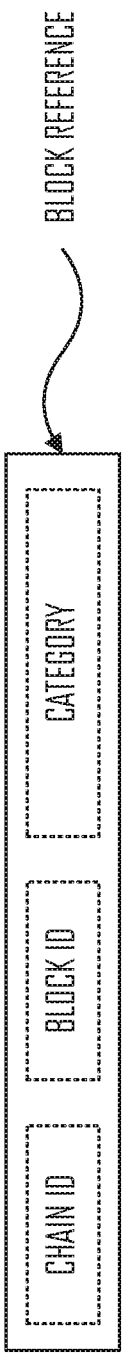
FIG. 32 depicts a block reference configured to facilitate a potential future migration as described herein in which one or more improved technologies may be incorporated.

78. The system of ANY one of the above system clauses in which the first rendering 1735A includes a block reference that includes some or all components as shown in FIG. 32.

Figure 33:
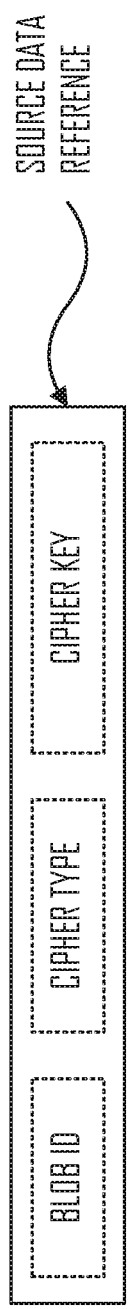
FIG. 33 depicts a source data reference configured to facilitate a potential future migration as described herein in which one or more improved technologies may be incorporated.

79. The system of ANY one of the above system clauses in which the first rendering 1735A includes a source data reference that includes some or all components as shown in FIG. 33.

Figure 34:
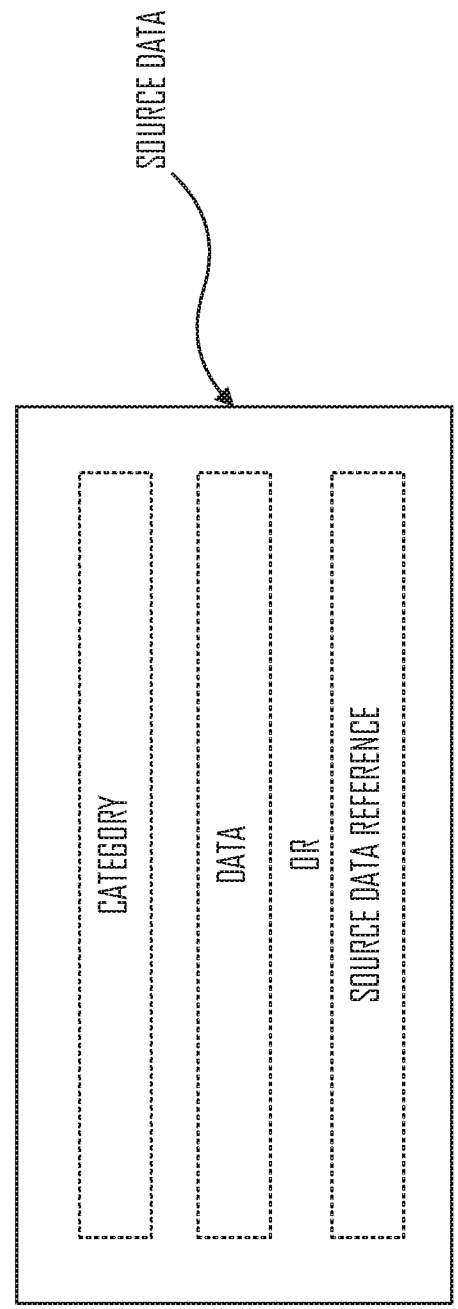
FIG. 34 depicts source data configured to facilitate a potential future migration as described herein in which one or more improved technologies may be incorporated.

80. The system of ANY one of the above system clauses in which the first rendering 1735A includes source data that includes some or all components as shown in FIG. 34.

Figure 35:
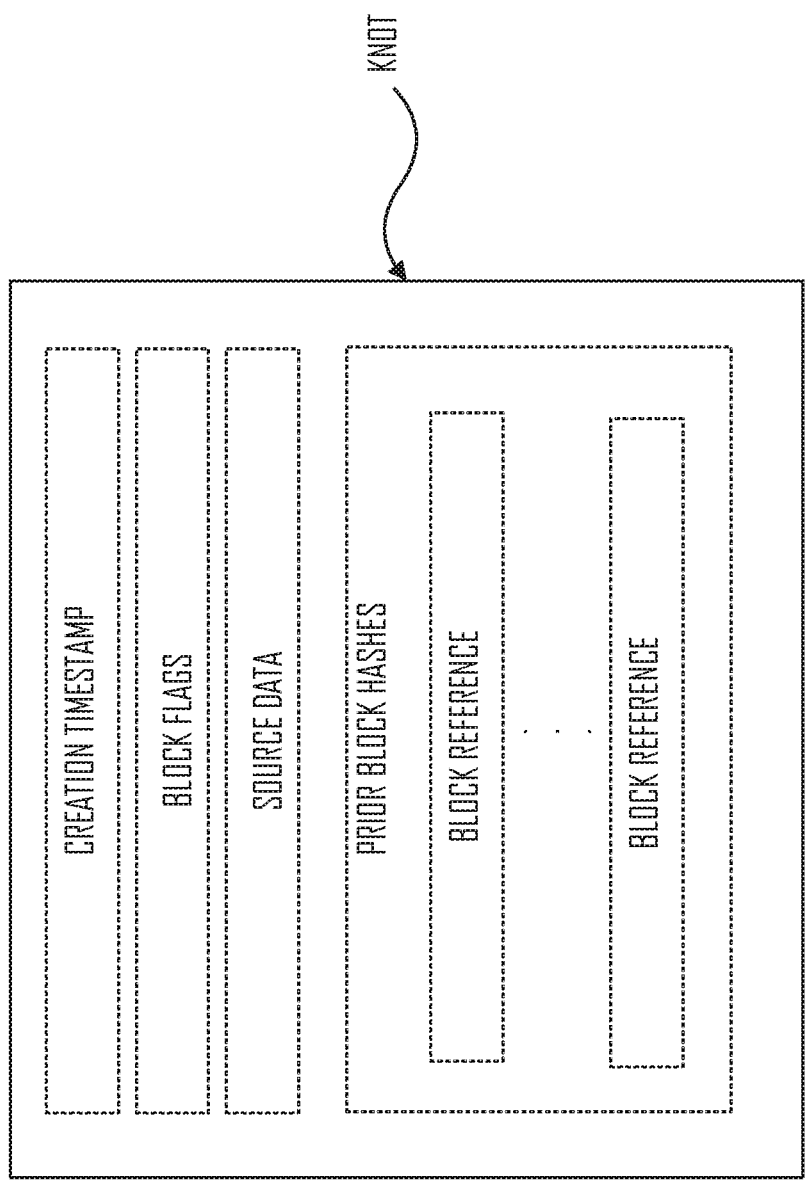
FIG. 35 depicts a knot configured to facilitate a potential future migration as described herein in which one or more improved technologies may be incorporated.

81. The system of ANY one of the above system clauses in which the first rendering 1735A includes a knot that includes some or all components as shown in FIG. 35.

Figure 36:
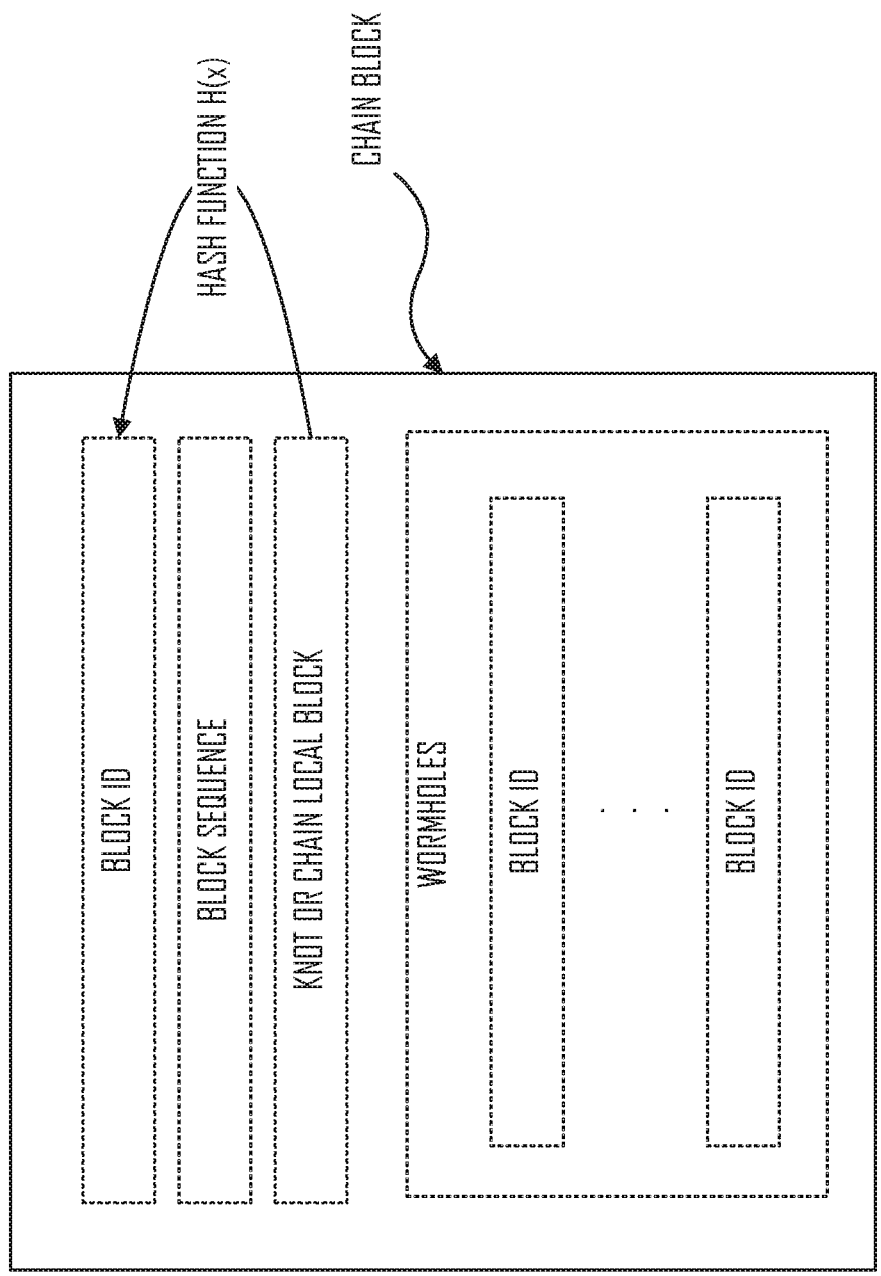
FIG. 36 depicts a chain block configured to facilitate a potential future migration as described herein in which one or more improved technologies may be incorporated.

82. The system of ANY one of the above system clauses in which the first rendering 1735A includes a chain block that includes some or all components as shown in FIG. 36.

Figure 37:
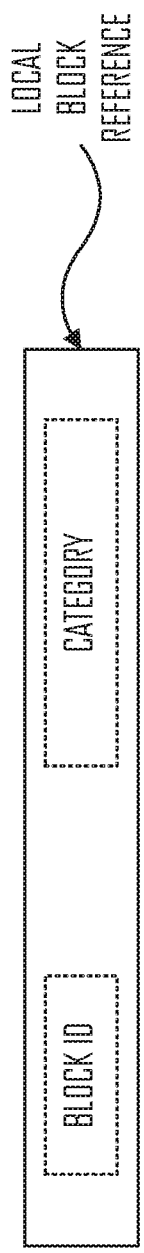
FIG. 37 depicts a local block reference configured to facilitate a potential future migration as described herein in which one or more improved technologies may be incorporated.

83. The system of ANY one of the above system clauses in which the first rendering 1735A includes a local block reference that includes some or all components as shown in FIG. 37.

Figure 38:
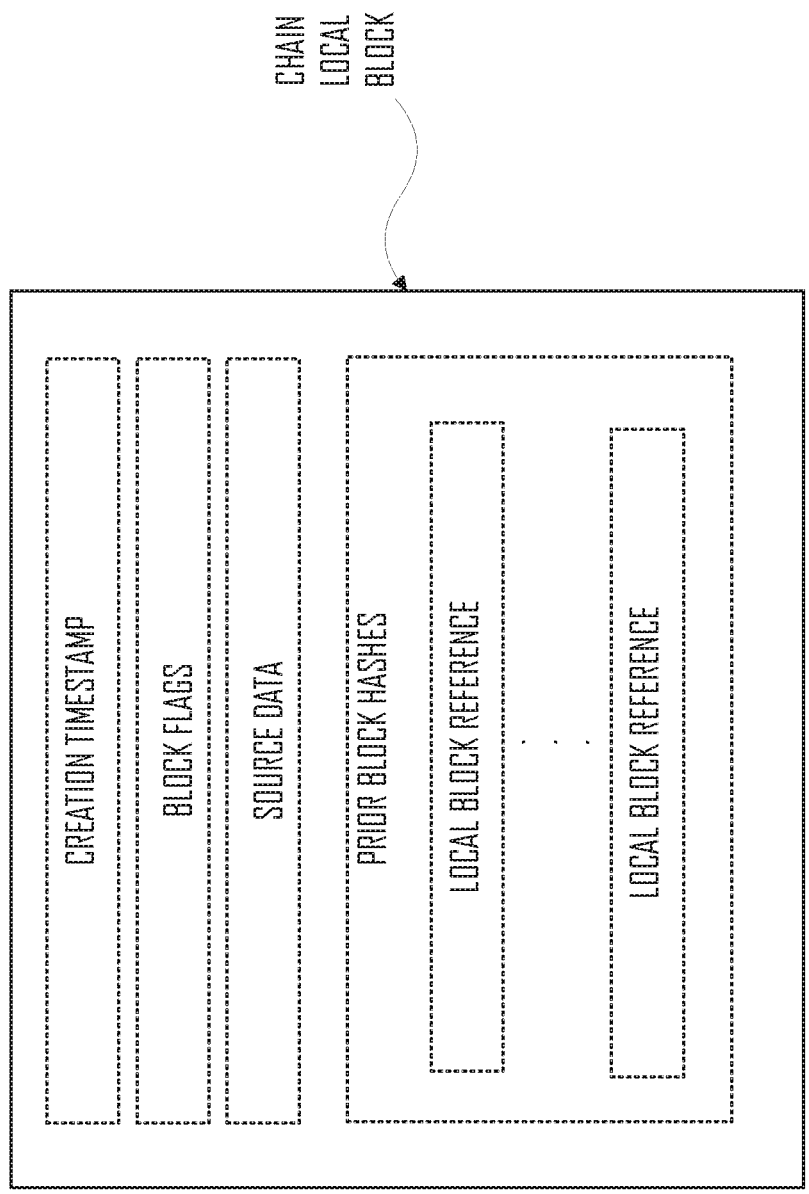
FIG. 38 depicts a chain local block configured to facilitate a potential future migration as described herein in which one or more improved technologies may be incorporated.

84. The system of ANY one of the above system clauses in which the first rendering 1735A includes a chain local block that includes some or all components as shown in FIG. 38.

Figures 39, 40:
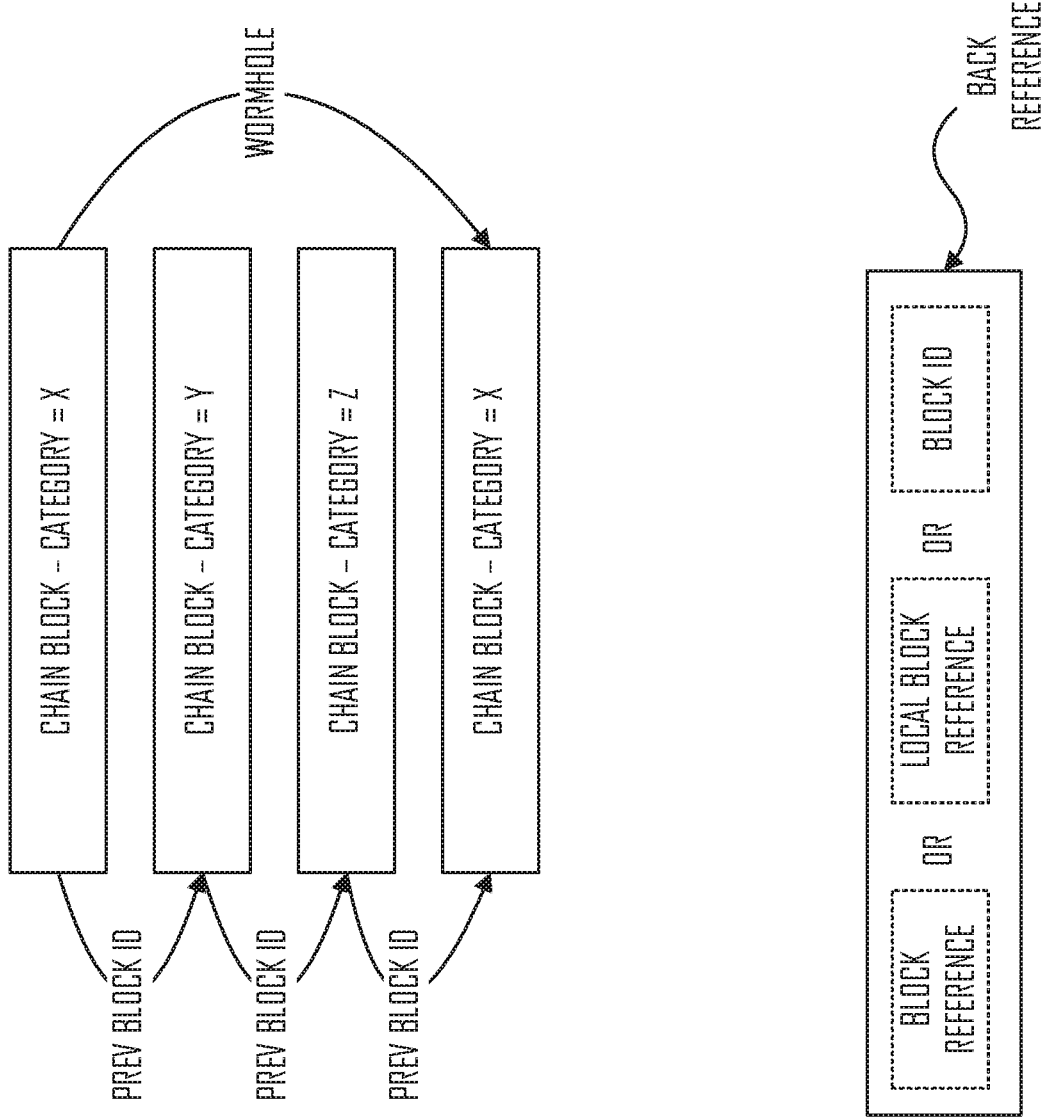
FIG. 39 depicts a wormhole configured to facilitate a potential future migration as described herein in which one or more improved technologies may be incorporated.
FIG. 40 depicts a back reference configured to facilitate a potential future migration as described herein in which one or more improved technologies may be incorporated.
Figure 47:
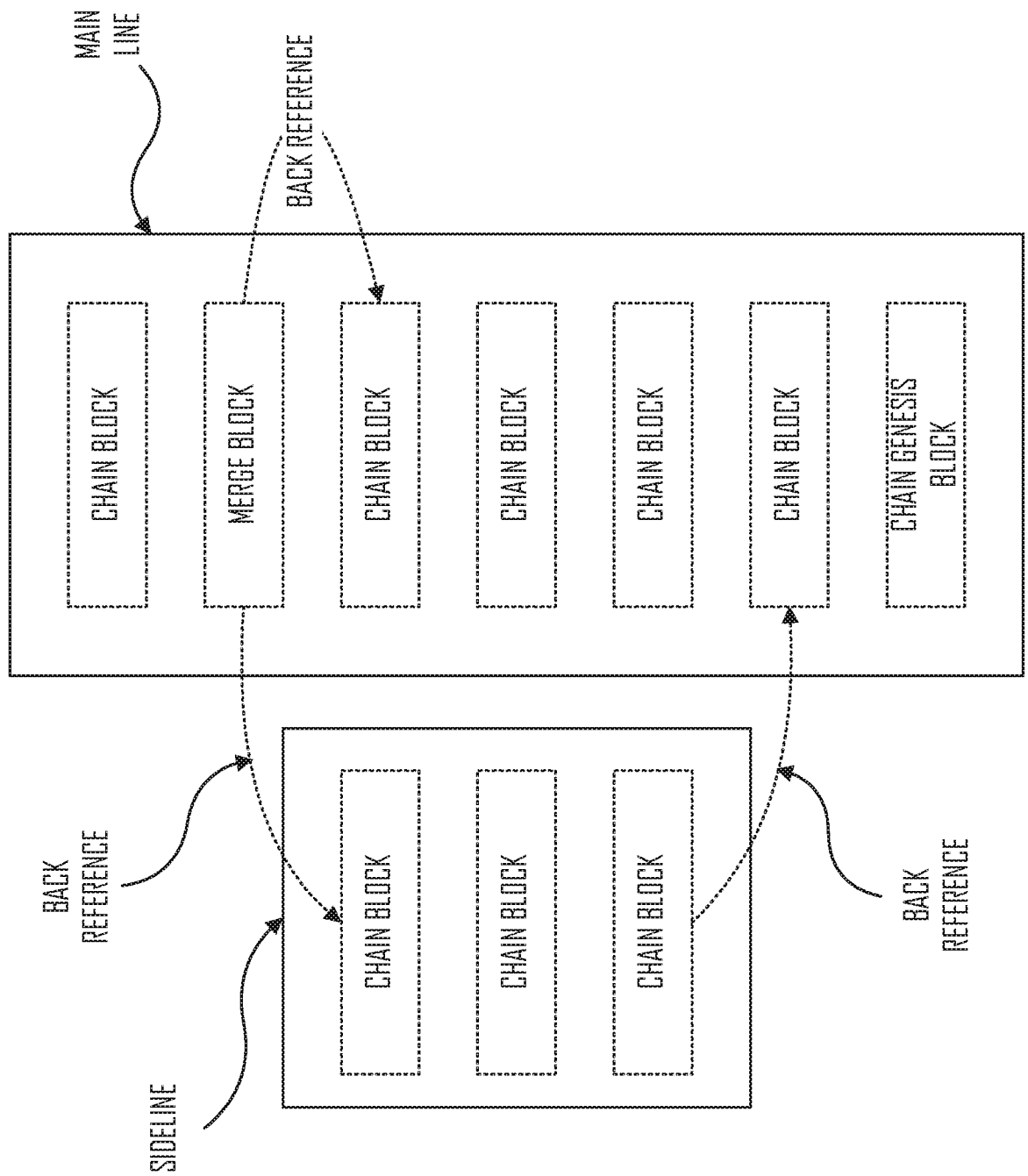

85. The system of ANY one of the above system clauses in which the first rendering 1735A is constructed using a wormhole that includes some or all components as shown in FIG. 39.

86. The system of ANY one of the above system clauses in which the first rendering 1735A includes a back reference that includes some or all components as shown in FIG. 40.

Figure 43:
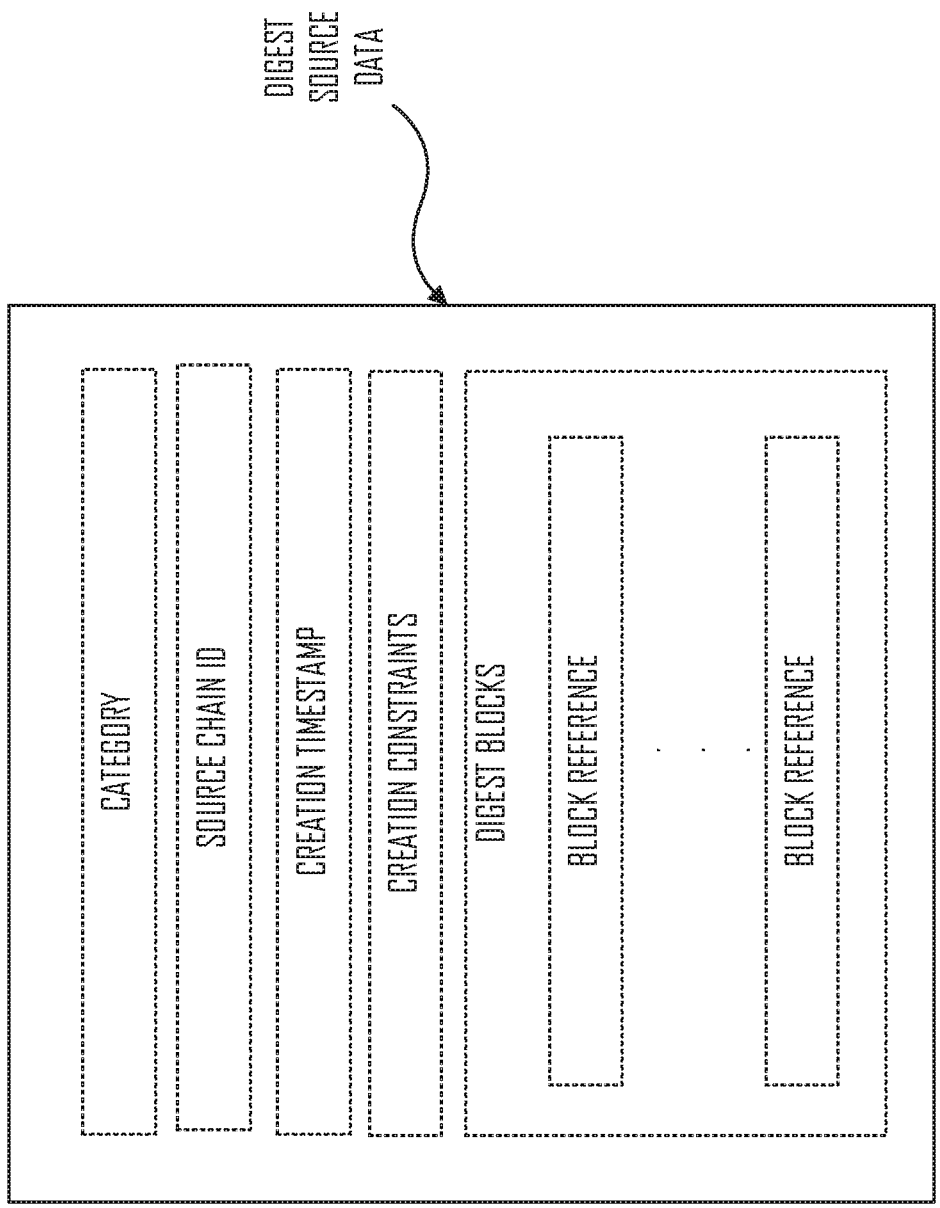
FIG. 43 depicts digest source data configured to facilitate a potential future migration as described herein in which one or more improved technologies may be incorporated.

87. The system of ANY one of the above system clauses in which the first rendering 1735A includes digest source data that includes some or all components as shown in FIG. 43.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A content reconstitution preparedness method comprising:
    invoking transistor-based circuitry configured to obtain first user content from a first human entity via a first computing device;
    invoking transistor-based circuitry configured to record a first rendering of said first user content onto a first blockchain node and a second rendering of said first user content onto a second blockchain node, wherein a first cryptographic hash at least partly protects said first rendering against surreptitious tampering, wherein a second cryptographic hash protects said second rendering against surreptitious tampering, wherein said first and second cryptographic hashes are not identical, and wherein recording said first rendering of said first user content comprises
        (1) generating said first rendering by extracting secondary data from a raw version of said first user content for recordation in archival storage media and by including a reference to said secondary data with a remainder of said first user content in said first rendering of said first user content and
        (2) after extracting said secondary data from said raw version of said first user content, generating said second rendering by including at least a reference to said secondary data with said remainder of said first user content in said second rendering of said first user content;
    invoking transistor-based circuitry configured to trigger a recordation of secondary content of said first user content onto one or more storage media as an automatic and conditional response partly based on a physical location of said first computing device and partly based on said first and second renderings both comprising at least one pointer indicating a first storage location of said secondary content; and
    invoking transistor-based circuitry configured to implement a programmatic migration from said first rendering at least to one or more other renderings owned by one or more other human entities after a catastrophic loss of at least said second rendering.

2. The method of claim 1, wherein implementing a programmatic migration from said first rendering to a third rendering comprises:
    implementing a partner block regeneration protocol upon a third node partly based on a particular component of said first rendering relating to said third node and partly based on a determination that said third node has no counterpart component corresponding to said particular component.

3. The method of claim 1 comprising:
    implementing a programmatic migration from said first rendering to a third rendering.

4. The method of claim 1, comprising:
    invoking transistor-based circuitry configured to implement a programmatic migration from said first rendering at least to one or more other renderings as a mode of recovery after a catastrophic loss of at least said second rendering.

5. A content reconstitution preparedness method comprising:
    invoking transistor-based circuitry configured to obtain first user content via a first computing device;
    invoking transistor-based circuitry configured to record a first rendering of said first user content onto a first node and a second rendering of said first user content onto a second node, wherein a first cryptographic hash at least partly protects said first rendering, wherein a second cryptographic hash protects said second rendering;
    invoking transistor-based circuitry configured to trigger a recordation of secondary content of said first user content onto one or more storage media as an automatic and conditional response partly based on a physical location of said first computing device and partly based on said first and second renderings both comprising at least one pointer indicating a first storage location of said secondary content; and
    implementing a programmatic migration from said first rendering to a third rendering of said first user content, wherein said implementing said programmatic migration comprises:
        implementing a partner block regeneration protocol upon a third node partly based on a particular component of said first rendering relating to said third node and partly based on a determination that said third node has no counterpart component corresponding to said particular component, wherein implementing said partner block regeneration protocol comprises reconstituting said particular component by generating a counterpart component on said third node.

6. A content reconstitution preparedness method comprising:
    invoking transistor-based circuitry configured to obtain first user content via a first computing device;
    invoking transistor-based circuitry configured to record a first rendering of said first user content onto a first node and a second rendering of said first user content onto a second node, wherein said first and second renderings of said first user content are respectively protected by first and second hashes that are not identical, wherein said first cryptographic hash at least partly protects said first rendering of said first user content against tampering, wherein said second cryptographic hash protects said second rendering of said first user content against tampering, and wherein recording said first rendering of said first user content comprises generating said first rendering of said first user content by extracting secondary data from a raw version of said first user content for recordation in archival storage media and by including a reference to said secondary data with a remainder of said first user content in said first rendering of said first user content; and invoking transistor-based circuitry configured to trigger a recordation of secondary content of said first user content onto one or more storage media as an automatic and conditional response partly based on a physical or other location of said first computing device and partly based on said first and second renderings of said first user content both comprising at least one pointer indicating a first storage location of said secondary content.

7. The method of claim 6 wherein said first rendering is encrypted or partly encrypted and wherein said second rendering is encrypted or partly encrypted.

8. The method of claim 6 wherein the invoking the transistor-based circuitry configured to record the first rendering of the first user content onto the first node and the second rendering of the first user content onto the second node comprises:

modifying the first node so that more than half of the first rendering is protected from tampering by a first cryptographic hash insofar that a correspondence between the first cryptographic hash and the first rendering signals that no such tampering of the first rendering has occurred.

9. The method of claim 6 wherein the first cryptographic hash protects a first part of the first rendering, wherein another cryptographic hash protects another part of the first rendering, wherein the second cryptographic hash protects a first part of the second rendering, and wherein yet another cryptographic hash protects another part of the second rendering.

10. The method of claim 6, wherein implementing a programmatic migration from said first rendering to a third rendering of said first user content comprises:

implementing both native node growth and a partner block regeneration protocol upon a third node.

11. The method of claim 6, comprising:

invoking transistor-based circuitry configured to implement a programmatic migration from said first rendering at least to one or more other renderings of said first user content as an automatic and conditional response to a catastrophic loss of at least said second rendering.

12. The method of claim 6, comprising:

implementing said programmatic migration from said first rendering to said third rendering of said first user content so as to provide said first user content in two or more respective non-identical renderings owned by respective users so as to manifest a preparedness for a future migration.

13. The method of claim 6, comprising:

implementing a programmatic migration by providing said first user content in two or more respective non-identical renderings including said first and second renderings of said first user content owned by different users so as to manifest a preparedness for a future migration.

14. The method of claim 6, comprising:

invoking transistor-based circuitry configured to select specific archival media near said physical location at which said first computing device was present when a sensor of said requesting device captured a component of said first user content.

15. The method of claim 6, comprising:

invoking transistor-based circuitry configured to select specific archival media near said physical location at which said first computing device was present when a user input of said requesting device downloaded a component of said first user content.

16. The method of claim 6 comprising:

generating said second rendering of said first user content by including at least a reference to said secondary data with said remainder of said first user content in said second rendering of said first user content.

17. The method of claim 6, wherein said first and second renderings each include data category metadata that describes a portion of or an entirety of at least said respective rendering.

18. The method of claim 6, wherein a blockchain node creates a sideline to facilitate creation of timely renderings, wherein said sideline subsequently merges with the blockchain node that created it.

19. The method of claim 6, comprising:

implementing a programmatic migration by providing said first user content in said first and second renderings that are non-identical renderings respectively owned by different users so as to manifest a preparedness for a future programmatic migration of said first or second node.

20. The method of claim 6, wherein said reference to said secondary data included with said remainder of said first user content in said first rendering of said first user content indicates a first entity that owns said first rendering and wherein said reference to said secondary data included with said remainder of said first user content in said second rendering of said first user content indicates a second entity that owns said second rendering.

* * * * *